US008881173B2

(12) United States Patent
Mikami

(10) Patent No.: US 8,881,173 B2
(45) Date of Patent: Nov. 4, 2014

(54) EVENT PROCESSING SYSTEM, DISTRIBUTION CONTROLLER, EVENT PROCESSING METHOD, DISTRIBUTION CONTROL METHOD, AND PROGRAM STORAGE MEDIUM

(75) Inventor: Sawako Mikami, Tokyo (JP)

(73) Assignee: NEC Corporation, Tokyo (JP)

( * ) Notice: Subject to any disclaimer, the term of this patent is extended or adjusted under 35 U.S.C. 154(b) by 371 days.

(21) Appl. No.: 13/384,742

(22) PCT Filed: Jul. 15, 2010

(86) PCT No.: PCT/JP2010/062392
§ 371 (c)(1),
(2), (4) Date: Jan. 18, 2012

(87) PCT Pub. No.: WO2011/010711
PCT Pub. Date: Jan. 27, 2011

(65) Prior Publication Data
US 2012/0124594 A1    May 17, 2012

(30) Foreign Application Priority Data

Jul. 23, 2009    (JP) .................................. 2009-171860

(51) Int. Cl.
*G06F 9/54*    (2006.01)
(52) U.S. Cl.
CPC ....................................... *G06F 9/542* (2013.01)
USPC ........................................................ 719/318
(58) Field of Classification Search
CPC ........................................................ G06F 9/542
USPC ........................................................ 719/318
See application file for complete search history.

(56) References Cited

U.S. PATENT DOCUMENTS

2006/0230077 A1    10/2006 Satou et al.
2008/0178212 A1    7/2008 Kinoshita et al.
2008/0228885 A1*   9/2008 Reed et al. .................... 709/206

FOREIGN PATENT DOCUMENTS

JP    2007-013804 A    1/2007
JP    2008-097111 A    4/2008
JP    2008-176644 A    7/2008
JP    4161998 B2    10/2008

OTHER PUBLICATIONS

Communication dated Dec. 17, 2013, issued by the Japanese Patent Office in corresponding Application No. 2011-523698.

* cited by examiner

*Primary Examiner* — Brian W Wathen
(74) *Attorney, Agent, or Firm* — Sughrue Mion, PLLC

(57) ABSTRACT

The number of dispatch rules set to each dispatcher is reduced in an event processing system.
An event processing system includes a distribution controller 100 and a plurality of dispatchers 300. To each of the plurality of dispatchers 300, dispatching target attribute information, that is attribute information included in an event 601 that is a dispatching target for the dispatchers 300, has been assigned. The distribution controller 100 sets a dispatch rule 604 including a dispatch condition indicating one or more conditions of attribute information included in an event 601 and a destination of an event 601 that satisfies the dispatch condition to the dispatchers 300, to which the dispatching target attribute information matching any one of the conditions of attribute information included in the dispatch condition of the dispatch rule 604 has been assigned, among the plurality of dispatchers 300.

14 Claims, 23 Drawing Sheets

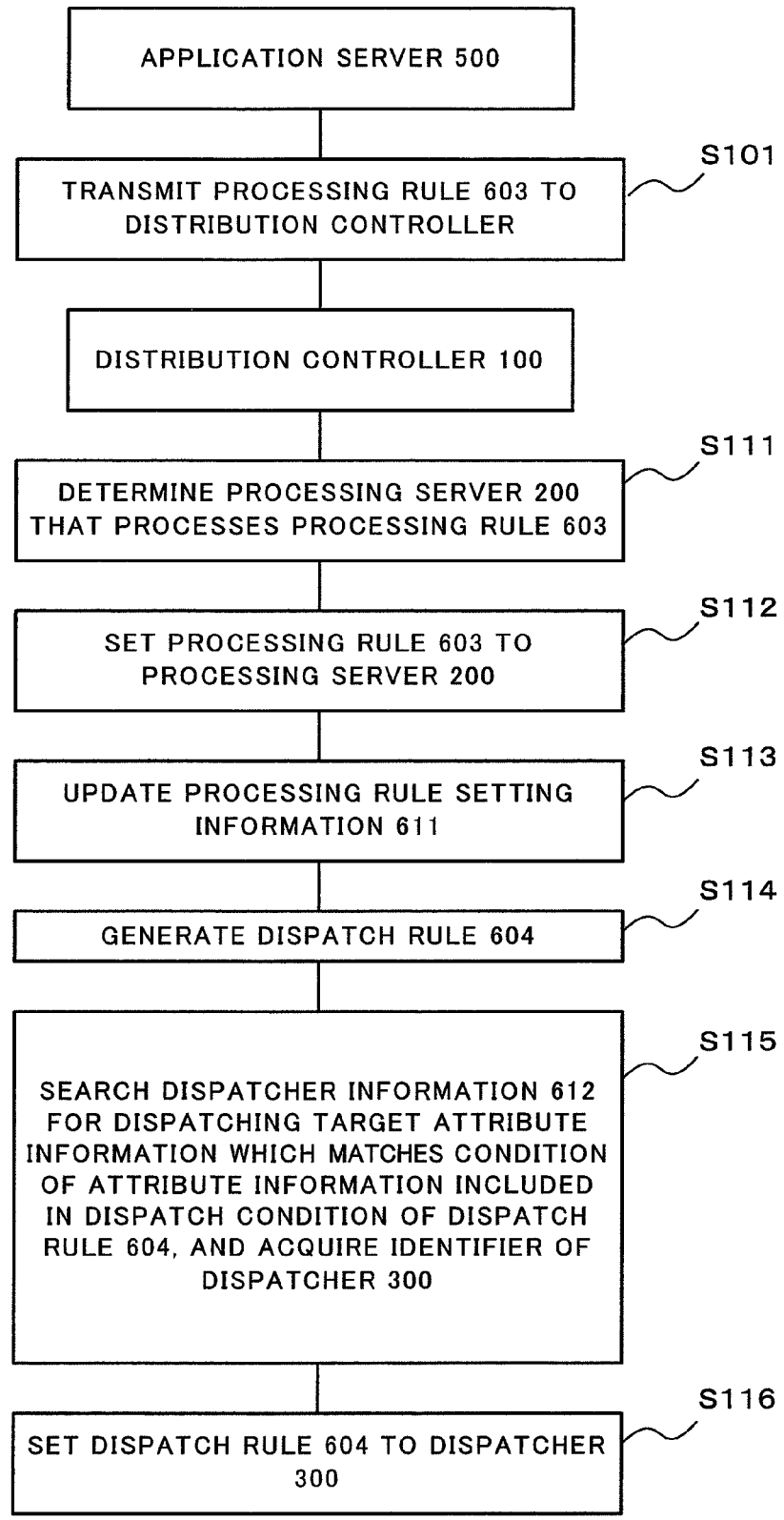

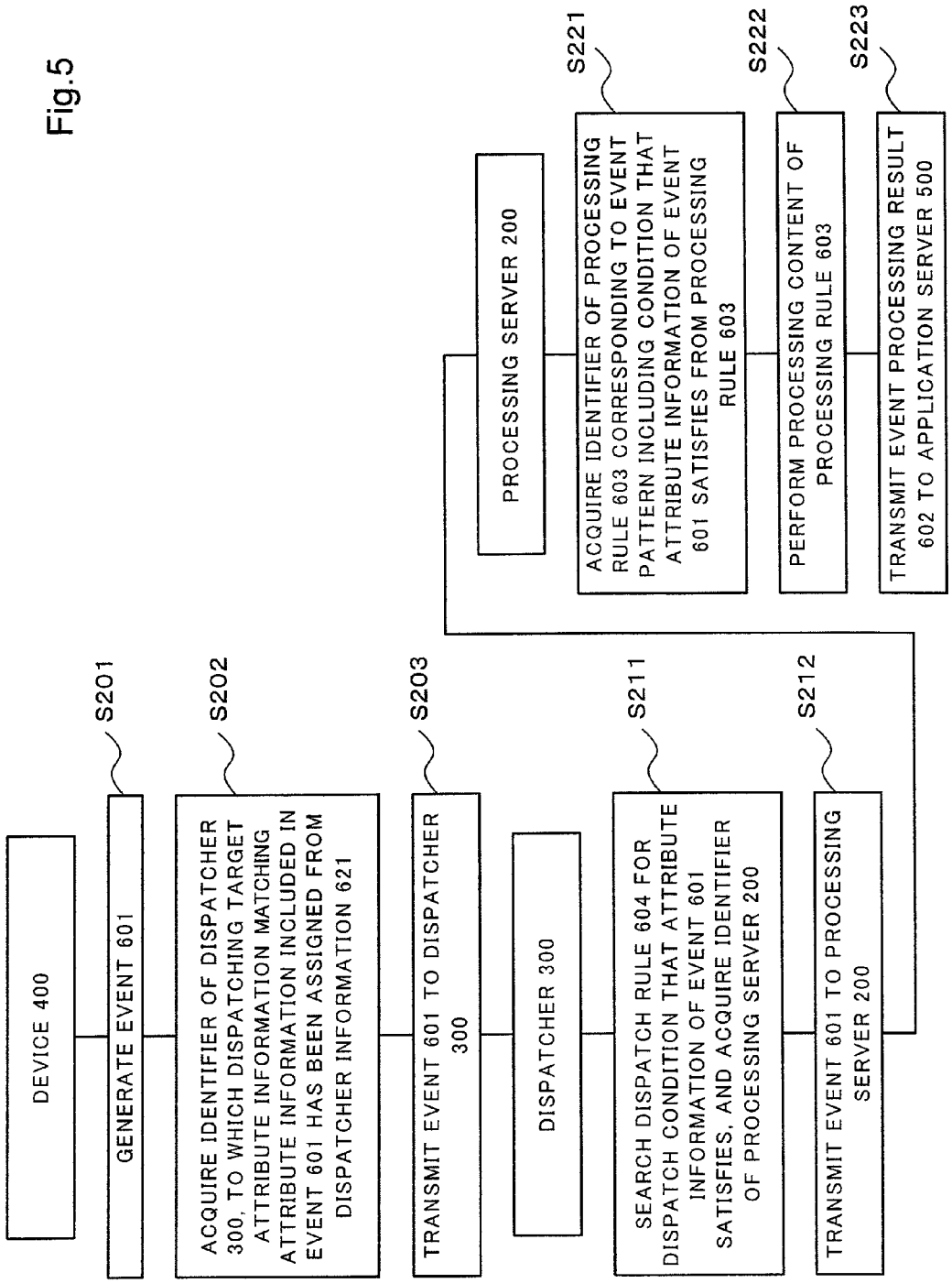

Fig.6

603 PROCESSING RULE

| PROCESSING RULE IDENTIFIER | EVENT PATTERN | PROCESSING CONTENT |
|---|---|---|
| Rule_PS1 | Event(UserID=10, Area=Minato-ku) & Event(UserID=11, Area=Minato-ku) | notify to AS1 |
| Rule_PS2 | Event(UserID=12, Area=Shinagawa-ku) & Event(UserID=13, Area=Shinagawa-ku) | notify to AS2 |

603 PROCESSING RULE

| PROCESSING RULE IDENTIFIER | EVENT PATTERN | PROCESSING CONTENT |
|---|---|---|
| Rule_PS3 | Event(UserID=14, Area=Minato-ku) & Event(UserID=15, Area=Minato-ku) | notify to AS3 |

603 PROCESSING RULE

| PROCESSING RULE IDENTIFIER | EVENT PATTERN | PROCESSING CONTENT |
|---|---|---|
| Rule_PS4 | Event(UserID=16, Area=Shinagawa-ku) & Event(UserID=17, Area=Shinagawa-ku) | notify to AS4 |

Fig.7

611 PROCESSING RULE SETTING INFORMATION

| PROCESSING SERVER IDENTIFIER | PROCESSING RULE NUMBER | PROCESSING RULE IDENTIFIER |
|---|---|---|
| PS1 | 2 | Rule_PS1, Rule_PS2 |
| PS2 | 1 | Rule_PS3 |
| PS3 | 1 | Rule_PS4 |

Fig.8

612 DISPATCHER INFORMATION

| DISPATCHING TARGET ATTRIBUTE INFORMATION | DISPATCHER IDENTIFIER |
|---|---|
| Area=Minato-ku | Disp1 |
| Area=Shinagawa-ku | Disp2 |
| Area=Shinjuku-ku | Disp3 |
| Area=Bunkyo-ku | Disp4 |
| Area=Chuo-ku | Disp3 |
| Area=Chiyoda-ku | Disp3 |
| Area=Meguro-ku | Disp4 |

Fig.9

~604 DISPATCH RULE

| DISPATCH RULE IDENTIFIER | DISPATCH CONDITION | PROCESSING SERVER IDENTIFIER |
|---|---|---|
| Rule_Disp1 | Event(UserID=10, Area=Minato-ku) | PS1 |
| Rule_Disp2 | Event(UserID=11, Area=Minato-ku) | PS1 |
| Rule_Disp3 | Event(UserID=14, Area=Minato-ku) | PS2 |
| Rule_Disp4 | Event(UserID=15, Area=Minato-ku) | PS2 |
| Rule_Disp5 | Event(UserID=12, Area=Shinagawa-ku) | PS1 |
| Rule_Disp6 | Event(UserID=13, Area=Shinagawa-ku) | PS1 |
| Rule_Disp7 | Event(UserID=16, Area=Shinagawa-ku) | PS3 |
| Rule_Disp8 | Event(UserID=17, Area=Shinagawa-ku) | PS3 |

Fig.10

~604 DISPATCH RULE

| DISPATCH RULE IDENTIFIER | DISPATCH CONDITION | PROCESSING SERVER IDENTIFIER |
|---|---|---|
| Rule_Disp1 | Event(UserID=10, Area=Minato-ku) | PS1 |
| Rule_Disp2 | Event(UserID=11, Area=Minato-ku) | PS1 |
| Rule_Disp3 | Event(UserID=14, Area=Minato-ku) | PS2 |
| Rule_Disp4 | Event(UserID=15, Area=Minato-ku) | PS2 |

~604 DISPATCH RULE

| DISPATCH RULE IDENTIFIER | DISPATCH CONDITION | PROCESSING SERVER IDENTIFIER |
|---|---|---|
| Rule_Disp5 | Event(UserID=12, Area=Shinagawa-ku) | PS1 |
| Rule_Disp6 | Event(UserID=13, Area=Shinagawa-ku) | PS1 |
| Rule_Disp7 | Event(UserID=16, Area=Shinagawa-ku) | PS3 |
| Rule_Disp8 | Event(UserID=17, Area=Shinagawa-ku) | PS3 |

Fig.11

~621 DISPATCHER INFORMATION

| DISPATCHING TARGET ATTRIBUTE INFORMATION | DISPATCHER IDENTIFIER |
|---|---|
| Area=Minato-ku | Disp1 |
| Area=Shinagawa-ku | Disp2 |
| Area=Shinjuku-ku | Disp3 |
| Area=Bunkyo-ku | Disp4 |
| Area=Chuo-ku | Disp3 |
| Area=Chiyoda-ku | Disp3 |
| Area=Meguro-ku | Disp4 |

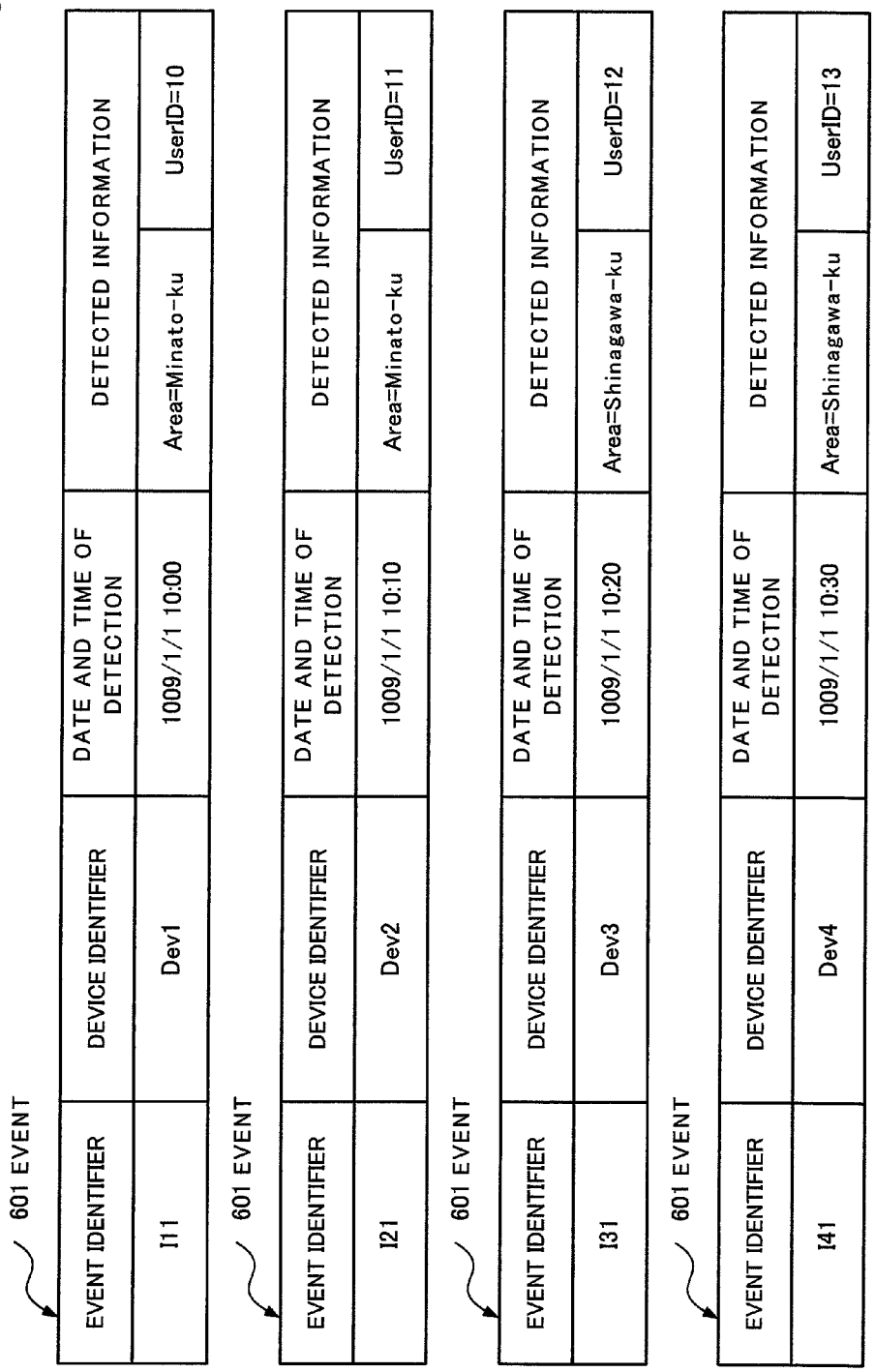

Fig.18

613 DISPATCHER INFORMATION

| DISPATCHING TARGET ATTRIBUTE INFORMATION | DISPATCHER IDENTIFIER |
|---|---|
| Area=Minato-ku | Disp1 |
| Area=Shinagawa-ku | Disp2 |

613 DISPATCHER INFORMATION

| DISPATCHING TARGET ATTRIBUTE INFORMATION | DISPATCHER IDENTIFIER |
|---|---|
| Area=Shinjuku-ku | Disp3 |
| Area=Bunkyo-ku | Disp4 |

605 DISPATCHER INFORMATION ACQUISITION REQUEST

606 DISPATCHER INFORMATION ACQUISITION RESPONSE

622 DISPATCHER INFORMATION

Fig.29

614 INTER-DISPATCHING TARGET ATTRIBUTES RELATION INFORMATION

| DISPATCHING TARGET ATTRIBUTE INFORMATION | RELATED DISPATCHING TARGET ATTRIBUTE INFORMATION |
|---|---|
| Area=Minato-ku | Area=Shinagawa-ku, Chiyoda-ku |
| Area=Shinagawa-ku | Area=Minato-ku, Meguro-ku |
| Area=Shinjuku-ku | Area=Bunkyo-ku, Chiyoda-ku |
| Area=Bunkyo-ku | Area=Shinjuku-ku, Chiyoda-ku |
| Area=Chuo-ku | Area=Minato-ku, Chiyoda-ku |
| Area=Chiyoda-ku | Area=Minato-ku, Chuo-ku |
| Area=Meguro-ku | Area=Shinagawa-ku |

Fig.30

606 DISPATCHER INFORMATION ACQUISITION RESPONSE

| DISPATCHING TARGET ATTRIBUTE INFORMATION | DISPATCHER |
|---|---|
| Area=Minato-ku | Disp1 |
| Area=Shinagawa-ku | Disp2 |
| Area=Chiyoda-ku | Disp3 |

Fig.31

622 DISPATCHER INFORMATION

| DISPATCHING TARGET ATTRIBUTE INFORMATION | DISPATCHER |
|---|---|
| Area=Minato-ku | Disp1 |
| Area=Shinagawa-ku | Disp2 |
| Area=Chiyoda-ku | Disp3 |

EVENT PROCESSING SYSTEM, DISTRIBUTION CONTROLLER, EVENT PROCESSING METHOD, DISTRIBUTION CONTROL METHOD, AND PROGRAM STORAGE MEDIUM

CROSS REFERENCE TO RELATED APPLICATIONS

This application is a National Stage of international Application No. PCT/JP2010/062392 filed Jul. 15, 2010, claiming priority based on Japanese Patent Application No. 2009-171860, the contents of all of which are incorporated herein by reference in their entirety.

TECHNICAL FIELD

The present invention relates to an event processing system, a distribution controller, an event processing method, a distribution control method, and a program storage medium.

BACKGROUND ART

An example of an event processing system which processes a large number of events generated in devices such as various sensors, RFID (Radio Frequency Identification) readers is described in Japanese Patent Publication No. 4161998. FIG. 32 shows a load distributing and dispatching system described in Japanese Patent Publication No. 4161998.

Referring to FIG. 32, the load distributing and dispatching system includes an event processing distributing unit 901, a context-independent dispatching unit 902, a plurality of context-dependent dispatching units (dispatchers) 903a and 903b (hereinafter, these are abbreviated as 903), and a plurality of event processing servers 904a and 904b (hereinafter, these are abbreviated as 904).

Applications 906a and 906b (hereinafter, these are abbreviated as 906) transmit an event processing rule to the event processing distributing unit 901 (arrow 911). The event processing distributing unit 901 sets the processing rule to one of the plurality of processing servers 904 (arrow 912). The event processing distributing unit 901 generates an event dispatching rule (dispatch rule) in such a way that an event processed according to the processing rule is transmitted to the processing server to which the processing rule is set, and sets the generated dispatch rule to the context-dependent dispatching units 903 (arrows 913a and 913b).

The context-independent dispatching unit 902, when receiving an event from a device, 905, such as any of devise 905a and device 905b, dispatches the event to the context-dependent dispatching units 903 at random (arrows 914a, 914b, 915a, and 915b). The context-dependent dispatching units 903, when receiving the event from the context-independent dispatching unit 902, dispatches the event to the event processing servers 904 to which the processing rule for the event is set based on the event dispatching rule that has been set (arrows 916a, 916b, 916c, and 916d). The event processing servers 904 processes the event based on the processing rule and notifies the applications 906 of an event processing result (arrows 917a and 917b).

SUMMARY OF INVENTION

Technical Problem

In the load distributing and dispatching system described in Japanese Patent Publication No. 4161998 mentioned above, the dispatch rule is generated based on the processing rule registered from the application and set to each dispatcher. There is a possibility that the dispatcher receives events transmitted from all devices. Therefore, the dispatcher cannot specify in advance the event that would be received. Accordingly, all the dispatch rules generated on the event processing distributing unit are registered in each dispatcher. When a large number of processing rules are registered from the application, a large number of dispatch rules are also generated. For this reason, when a large number of processing rules exist, the number of dispatch rules set to each dispatcher increases and whereby, a problem in which a storage area required in the dispatcher increases or a time for searching for a dispatch destination of the event increases occurs.

An object of the present invention is to provide an event processing system, a distribution controller, an event processing method, a distribution control method and a program storage medium which solves the above-mentioned problem.

Solution to Problem

An event processing system according to an exemplary aspect of the invention includes a distribution control means and a plurality of dispatch means, wherein dispatching target attribute information, that is attribute information included in an event that is a dispatching target for each of the plurality of dispatch means, has been assigned to the each of the plurality of dispatch means, the distribution control means sets a dispatch rule including a dispatch condition indicating one or more conditions of attribute information included in an event and a destination of an event that satisfies the dispatch condition to the dispatch means, to which the dispatching target attribute information matching any one of the conditions of attribute information included in the dispatch condition of the dispatch rule has been assigned, among the plurality of dispatch means, and the each of the plurality of dispatch means, when receiving an event, transmits the received event to the destination corresponding to the dispatch condition when attribute information included in the received event satisfies the dispatch condition, with reference to the dispatch rule.

A distribution controller according to an exemplary aspect of the invention includes a dispatch rule generation means for generating a dispatch rule including a dispatch condition indicating one or more conditions of attribute information included in an event and a destination of an event that satisfies the dispatch condition, and a dispatch rule setting means for setting the dispatch rule to a dispatch means, to which dispatching target attribute information matching any one of the conditions of attribute information included in the dispatch condition of the dispatch rule has been assigned, among a plurality of the dispatch means.

An event processing method according to an exemplary aspect of the invention includes setting, from a distribution controller, a dispatch rule including a dispatch condition indicating one or more conditions of attribute information included in an event and a destination of an event that satisfies the dispatch condition to a dispatcher, to which dispatching target attribute information matching any one of the conditions of attribute information included in the dispatch condition of the dispatch rule has been assigned, among a plurality of the dispatchers, and transmitting, in the dispatcher received an event, the received event to the destination corresponding to the dispatch condition when attribute information included in the received event satisfies the dispatch condition.

A distribution control method according to an exemplary aspect of the invention includes generating a dispatch rule including a dispatch condition indicating one or more conditions of attribute information included in an event and a destination of an event that satisfies the dispatch condition, and setting the dispatch rule to a dispatcher, to which a dispatching target attribute information matching any one of the conditions of attribute information included in the dispatch condition of the dispatch rule has been assigned, among a plurality of the dispatchers.

A computer readable storage medium according to an exemplary aspect of the invention, records thereon a distribution control program, causing a computer to perform a method including generating a dispatch rule including a dispatch condition indicating one or more conditions of attribute information included in an event and a destination of an event that satisfies the dispatch condition, and setting the dispatch rule to a dispatcher, to which dispatching target attribute information matching any one of the conditions of attribute information included in the dispatch condition of the dispatch rule has been assigned, among a plurality of the dispatchers.

Advantageous Effects of Invention

The advantageous effect of the present invention is that the number of the dispatch rules set to each dispatcher can be reduced in an event processing system.

BRIEF DESCRIPTION OF DRAWINGS

FIG. 4 A flow chart showing setting operation of a dispatch rule 604 in the first exemplary embodiment of the present invention.

FIG. 5 A flow chart showing operation of event processing in the first exemplary embodiment of the present invention.

FIG. 6 A figure showing an example of a processing rule 603 in the first exemplary embodiment of the present invention.

FIG. 7 A figure showing an example of processing rule setting information 611 in the first exemplary embodiment of the present invention.

FIG. 8 A figure showing an example of dispatcher information 612 in the first exemplary embodiment of the present invention.

FIG. 9 A figure showing an example of a dispatch rule 604 generated in the distribution controller 100 in the first exemplary embodiment of the present invention.

FIG. 10 A figure showing an example of a dispatch rule 604 set to dispatchers 300 in the first exemplary embodiment of the present invention.

FIG. 11 A figure showing an example of dispatcher information 621 in the first exemplary embodiment of the present invention.

FIG. 12 A figure showing an example of events 601 in the first exemplary embodiment of the present invention.

FIG. 18 A figure showing an example of dispatcher information 613 in the second exemplary embodiment of the present invention.

FIG. 29 A figure showing an example of inter-dispatching target attributes relation information 614 in the fourth exemplary embodiment of the present invention.

FIG. 30 A figure showing an example of a dispatcher information acquisition response 606 in the fourth exemplary embodiment of the present invention.

FIG. 31 A figure showing an example of dispatcher information 622 in the fourth exemplary embodiment of the present invention.

Figure 1:
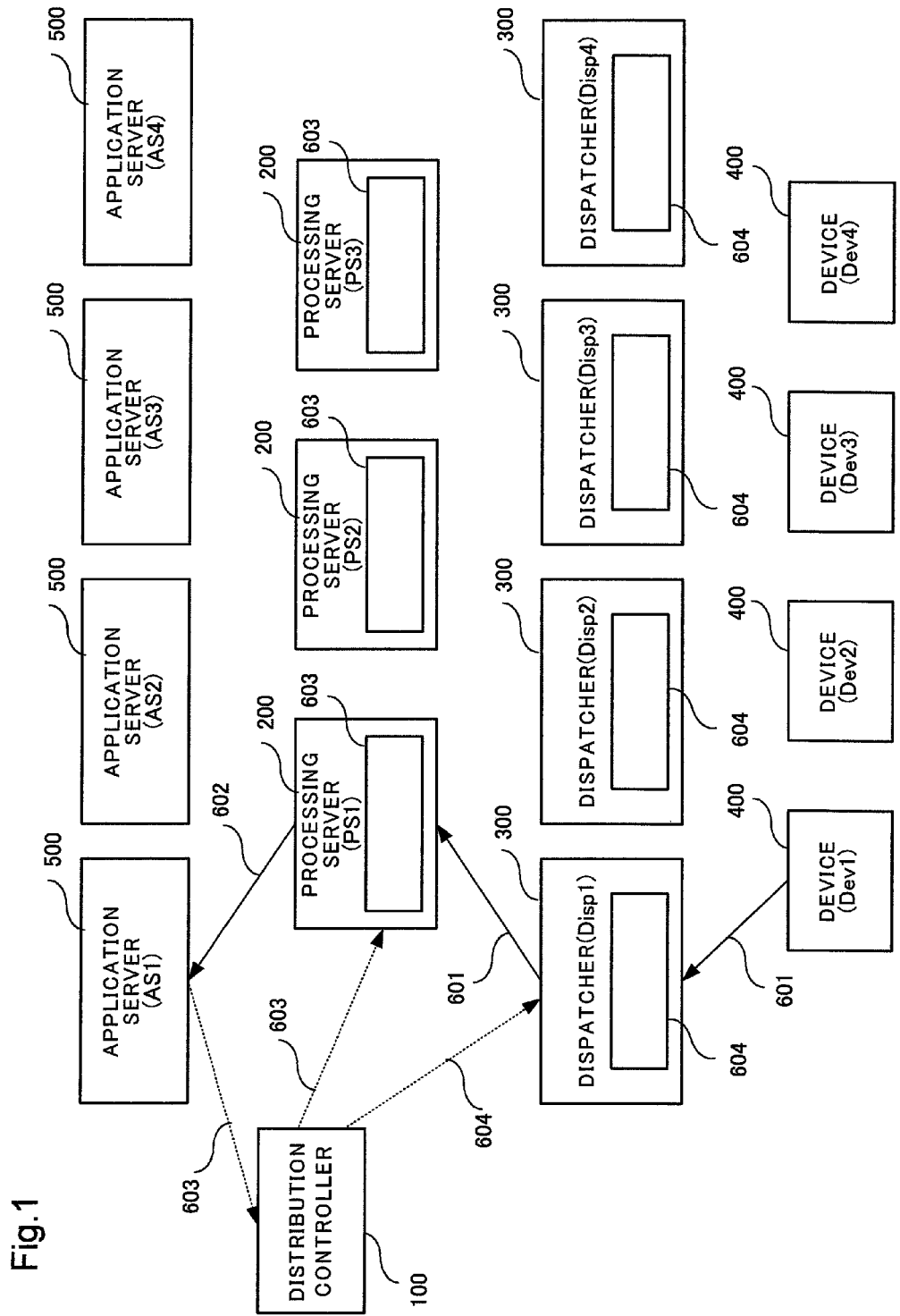
FIG. 1 A block diagram showing a configuration of a whole event processing system in a first exemplary embodiment of the present invention.

REFERENCE SIGNS LIST 100 distribution controller
101 processing rule setting unit
102 processing rule setting information storage unit
103 dispatch rule generation unit
104 dispatch rule setting unit
105 dispatcher information storage unit
110 distribution controller 120 dispatch rule generation device
126 dispatch rule delivery unit
130 dispatch rule setting device
134 dispatch rule setting unit
135 dispatcher information storage unit
140 distribution controller
147 dispatcher information delivery unit
150 distribution controller
157 dispatcher information delivery unit
158 inter-dispatching target attributes relation information storage unit
200 processing server
300 dispatcher
400 device
401 event transmission unit
402 dispatcher information storage unit
410 device
412 dispatcher information storage unit
413 dispatcher information acquisition unit
500 application server
601 event
602 event processing result
603 processing rule
604 dispatch rule
605 dispatcher information acquisition request
606 dispatcher information acquisition response
611 processing rule setting information
612 dispatcher information
613 dispatcher information
621 dispatcher information
622 dispatcher information

DESCRIPTION OF EMBODIMENTS

First Exemplary Embodiment

Next, a first exemplary embodiment of the present invention will be described in detail with reference to drawings.

Here, the exemplary embodiment will described by taking a system in which a movable device such as a portable phone periodically transmits position information of a user having the device as an event as an example.

FIG. 1 is a block diagram showing a configuration of a whole event processing system in the first exemplary embodiment of the present invention.

Referring to FIG. 1, the first exemplary embodiment of the event processing system of the present invention includes a distribution controller 100 installed on a network (not shown), a plurality of processing servers 200, a plurality of dispatchers 300, a device 400, and an application server 500.

In FIG. 1, as the plurality of processing servers 200, there are three processing servers whose identifiers are PS1 to PS3, respectively. As the plurality of dispatchers 300, there are four dispatchers whose identifiers are Disp1 to 4, respectively. As the devices 400, there are four devices whose identifiers are Dev1 to 4, respectively. As the application servers 500, there are four application servers whose identifiers are AS1 to 4, respectively.

Note that, the numbers of the processing servers 200, the dispatchers 300, the devices 400, and the application servers 500 are not limited to these numbers.

In each drawing and in the following description, a code in brackets shown after the reference number indicates an identifier. For example, "processing server 200 (PS1)" means the processing server 200 whose identifier is PS1 and "dispatcher 300 (Disp1)" means the dispatcher 300 whose identifier is Disp1. Such indication is similarly used for an event 601, a processing rule 603, and a dispatch rule 604.

The application server 500 transmits a processing rule 603 for performing processing of an event 601 generated in the device 400 such as an RFID reader, a sensor to the distribution controller 100. The distribution controller 100 sets the processing rule 603 to the processing server 200 and sets a dispatch rule 604 to the dispatcher 300. The dispatcher 300 transmits the event 601 received from the device 400 to the processing server 200 according to the dispatch rule 604. The processing server 200 processes an event 601 based on attribute information included in the event 601 and the processing rule 603 for the attribute information and notifies the application server 500 of an event processing result 602.

Next, an event 601, a processing rule 603, and a dispatch rule 604 in the first exemplary embodiment of the present invention will be described.

FIG. 12 is a figure showing an example of events 601 in the first exemplary embodiment of the present invention.

The event 601 includes detected information (context) indicating a state of a detected target as attribute information. For example, in a system for detecting a state of a person or a thing, the event 601 includes an identifier that uniquely identifies the detected target (person or thing) and one or more attributes indicating a state of the detected target (a position at which the person or the thing is detected or the like) as the attribute information.

In case of FIG. 12, events 601 include event identifiers I11, I21, I31, and I41 that identify each event 601, device identifiers Dev1 to 4 that identify the device 400 that is an event generation source, the date and time of detection of each event 601, and detected information (a position (Area) at which a detected target is detected and a user identifier (User ID) that is the identifier of the detected target) as attribute information, respectively.

FIG. 6 is a figure showing an example of a processing rule 603 in the first exemplary embodiment of the present invention.

As shown in FIG. 6, the processing rules 603 include processing rule identifiers Rule_PS1 to 4, and event patterns and processing contents. The individual event patterns and processing contents are associated with the respective processing rule identifiers. Here, the event pattern indicates one or more conditions of the attribute information for each of one or more events 601 processed in the processing server 200. The processing content indicates a content of processing performed on the processing server 200 when the processing server 200 receives events 601 which satisfy the event pattern.

FIG. 6 shows an example of the processing rules 603 (Rule_PS1 and Rule_PS2) set to the processing server 200 (PS1), the processing rule 603 (Rule_PS3) set to the processing server 200 (PS2), and the processing rule 603 (Rule_PS4) set to the processing server 200 (PS3).

For example, in case the processing rule 603 (Rule_PS1) as shown in FIG. 6 is set to the processing server 200 (PS1), when the processing server 200 (PS1) receives the event 601 (I11) including the attribute information which satisfies conditions "UserID=10, Area=Minato-ku" and the event 601 (I21) including the attribute information which satisfies conditions "UserID=11, Area=Minato-ku" in the event pattern, it notifies the application server 500 (AS1) according to the processing content.

FIG. 9 and FIG. 10 are figures showing an example of a dispatch rule 604 in the first exemplary embodiment of the present invention. As shown in FIG. 9 and FIG. 10, the dispatch rules 604 include dispatch rule identifiers Rule_Disp1 to 8, and dispatch conditions and identifiers of the processing servers 200. The individual dispatch conditions and identifiers of the processing servers 200 are associated with respective dispatch rule identifiers. Here, the dispatch condition shows one or more conditions of the attribute information for an event 601 to be dispatched by the dispatcher 300. The identifier of the processing server 200 indicates an identifier of the processing server 200 that is a destination to which the dispatcher 300 transmits an event 601 received on the dispatcher 300 in case the event 601 satisfies the dispatch condition.

FIG. 9 shows an example of the dispatch rules 604 (Rule_Disp1 to 8) generated by the distribution controller 100. FIG. 10 shows an example of the dispatch rules 604 (Rule_Disp1 to 4) set to the dispatcher 300 (Disp1) and the dispatch rules 604 (Rule_Disp5 to 8) set to the dispatcher 300 (Disp2).

For example, in case the dispatch rule 604 (Rule_Disp1) as shown in FIG. 10 is set to the dispatcher 300 (Disp1), when the dispatcher 300 (Disp1) receives the event 601 (I11) including the attribute information which satisfies a dispatch condition "UserID=10, Area=Minato-ku", it transmits the event 601 to the processing server 200 (PS1). In FIG. 1, the application server 500 is a server on which the application for performing the various information processes for events 601 operates. The application server 500, when receiving the event processing result 602 from the processing server 200, performs information processing according to the event processing result 602. Here, the event processing result 602 is a result obtained when the processing server 200 performs the processing of events 601 detected in the device 400. Further, the application server 500 transmits a processing rule 603 to the distribution controller 100.

The distribution controller 100 sets the processing rule 603 received from the application server 500 to the processing server 200. Further, the distribution controller 100 generates a dispatch rule 604 based on the processing rule 603 and sets it to the dispatcher 300.

Figure 2:
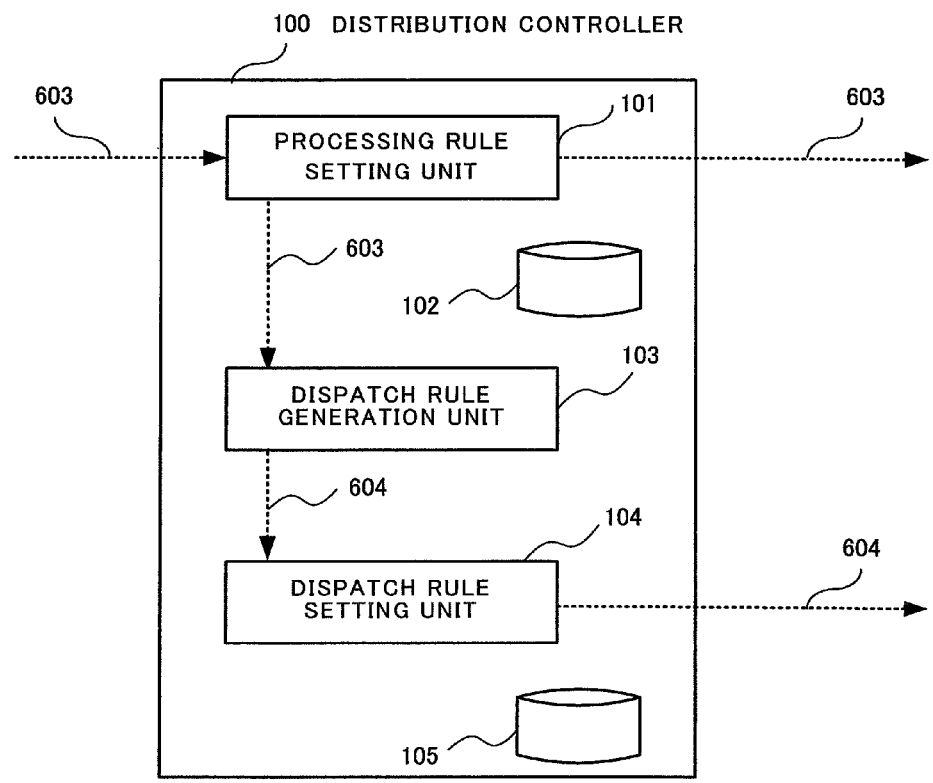
FIG. 2 A block diagram showing a configuration of a distribution controller 100 in the first exemplary embodiment of the present invention.

FIG. 2 is a block diagram showing a configuration of the distribution controller 100 in the first exemplary embodiment of the present invention. Referring to FIG. 2, the distribution controller 100 includes a processing rule setting unit 101, a processing rule setting information storage unit 102, a dispatch rule generation unit 103, a dispatch rule setting unit 104, and a dispatcher information storage unit 105.

The processing rule setting unit 101 determines the processing server 200 in which the processing rule 603 received from the application server 500 to be registered and sets the processing rule 603 to the processing server 200.

The processing rule setting information storage unit 102 stores and manages processing rule setting information 611. The processing rule setting information 611 indicates a setting status of the processing rule 603 in each processing server 200. FIG. 7 is a figure showing an example of the processing rule setting information 611 in the first exemplary embodiment of the present invention. As shown in FIG. 7, the processing rule setting information 611 includes processing server identifiers PS1 to 3, and the numbers of the processing rules and sets of the processing rule identifiers. The individual numbers of processing rules and sets of processing rule identifiers are associated with respective processing server identifiers.

FIG. 7 shows an example of a case in which the processing rules 603 (Rule_PS1 and Rule_PS2) are set to the processing server 200 (PS1), the processing rule 603 (Rule_PS3) is set to the processing server 200 (PS2), and the processing rule 603 (Rule_PS4) is set to the processing server 200 (PS3).

The dispatch rule generation unit 103 generates the dispatch rule 604 in such a way that the event 601 processed according to the processing rule 603 is transmitted to the processing server 200 to which the processing rule 603 is set.

The dispatcher information storage unit 105 stores and manages dispatcher information 612. The dispatcher information 612 indicates dispatching target attribute information which has been assigned to each dispatcher 300. Here, the dispatching target attribute information indicates attribute information included in an event 601 that is a dispatching target for each dispatcher 300. FIG. 8 is a figure showing an example of the dispatcher information 612 in the first exemplary embodiment of the present invention. As shown in FIG. 8, the dispatcher information 612 includes the dispatching target attribute information and dispatcher identifiers Disp1 to 4 of the dispatcher 300 to which the dispatching target attribute information has been assigned. It is assumed that the dispatcher information 612 is set by a system administrator or the like. FIG. 8 shows an example of the dispatcher information 612 set to the distribution controller 100. In the example shown in FIG. 8, position information (Area) has been assigned to each dispatcher 300 as the dispatching target attribute information.

The dispatch rule setting unit 104 determines the dispatcher 300 to which the generated dispatch rule 604 to be set with reference to the dispatcher information 612, and sets the dispatch rule 604 to the dispatcher 300.

The device 400 generates an event 601 and transmits it to the dispatcher 300.

Figure 3:
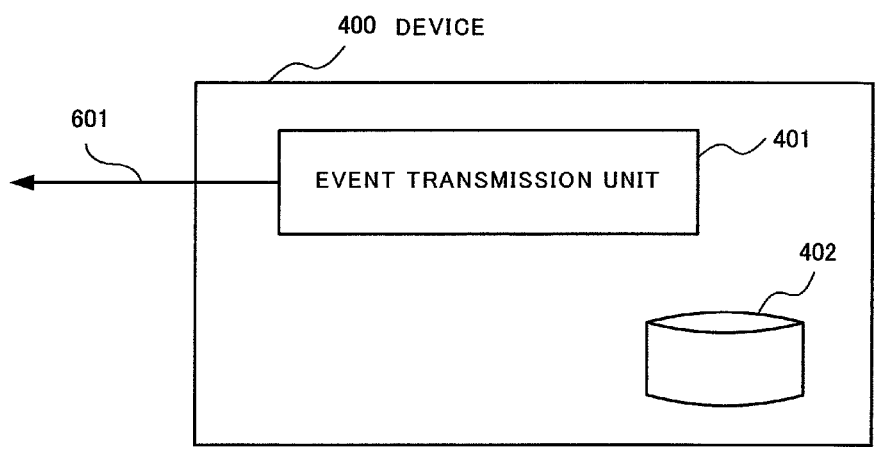
FIG. 3 A block diagram showing a configuration of a device 400 in the first exemplary embodiment of the present invention.

FIG. 3 is a block diagram showing a configuration of the device 400 in the first exemplary embodiment of the present invention.

The device 400 includes an event transmission unit 401 and a dispatcher information storage unit 402.

The dispatcher information storage unit 402 stores and manages dispatcher information 621. The dispatcher information 621 indicates, like the dispatcher information 612, the dispatching target attribute information which has been assigned to each dispatcher 300. FIG. 11 is a figure showing an example of the dispatcher information 621 in the first exemplary embodiment of the present invention. As shown in FIG. 11, the dispatcher information 621 includes the dispatching target attribute information and the dispatcher identifiers Disp1 to 4 of the dispatcher 300 to which the dispatching target attribute information has been assigned. FIG. 11 shows an example of the dispatcher information 621 assigned to each of the devices 400 (Dev1 to 4). It is assumed that the dispatcher information 621 is set by the system administrator or the like, like the dispatcher information 612.

The event transmission unit 401 generates an event 601 based on the information detected in the device 400. The event transmission unit 401 determines the dispatcher 300 that is the destination of the event 601 with reference to the dispatcher information 621, and transmits the event 601 to the dispatcher 300.

The dispatcher 300 stores the dispatch rule 604 set by the distribution controller 100. The dispatcher 300, when receiving the event 601 from the device 400, determines the processing server 200 that is the destination of the event 601 with reference to the dispatch rule 604, and transmits the event 601 to the processing server 200.

The processing server 200 stores the processing rule 603 set by the distribution controller 100. The processing server 200, when receiving the event 601 from the dispatcher 300, performs the processing content for the event 601 with reference to the processing rule 603.

Note that, the distribution controller 100, the processing server 200, the dispatcher 300, the device 400, and the application server 500 may be configured as an information processing apparatus which operates by program control.

Further, it is assumed that the system administrator sets the same content to both the dispatcher information 612 in the distribution controller 100 and the dispatcher information 621 in the device 400.

Next, operation of the first exemplary embodiment of the present invention will be described with reference to drawings.

First, setting operation of a dispatch rule 604 in the first exemplary embodiment of the present invention will be described. FIG. 4 is a flow chart showing the setting operation of the dispatch rule 604 in the first exemplary embodiment of the present invention.

The application server 500 which requests processing of events 601 transmits a processing rule 603 to the distribution controller 100 (step S101).

For example, the application servers 500 (AS1 to 4) transmit processing rules 603 (Rule_PS1 to 4) as shown in FIG. 6 to the distribution controller 100, respectively.

When the distribution controller 100 receives the processing rule 603, the processing rule setting unit 101 determines the processing server 200 which processes the processing rule 603 with reference to processing rule setting information 611 stored in the processing rule setting information storage unit 102 (step S111). The processing rule setting unit 101 sets the processing rule 603 to the determined processing server 200 (step S112). The processing rule setting unit 101 updates the processing rule setting information 611 and stores the updated processing rule setting information 611 in the processing rule setting information storage unit 102 (step S113).

Here, as a method to determine the processing server 200 which perform processing according to the processing rule 603, for example, a method in which the processing rule 603 is set in such a way that loads of the processing servers 200 balanced equally or a method in which the processing rules 603 having the same event patterns are set to the same processing server 200 as described in Japanese Patent Publication No. 4161998 may be used.

For example, the distribution controller 100 sets the processing rules 603 (Rule_PS1 and Rule_PS2) to the processing server 200 (PS1), sets the processing rule 603 (Rule_PS3) to the processing server 200 (PS2), and sets the processing rule 603 (Rule_PS4) to the processing server 200 (PS3). The distribution controller 100 stores processing rule setting information 611 as shown in FIG. 7 in the processing rule setting information storage unit 102.

The dispatch rule generation unit 103 generates a dispatch rule 604 in such a way that an event 601 processed according to the processing rule 603 is transmitted to the processing server 200 to which the processing rule 603 is set (step S114). Here, the dispatch rule generation unit 103 generates the dispatch rule 604 having "one or more conditions of the attribute information for an event 601" included in the event pattern of the processing rule 603 as a dispatch condition and the identifier of the processing server 200 to which the processing rule 603 is set as a destination.

For example, as shown in FIG. 9, the dispatch rule generation unit 103 generates dispatch rules 604 (Rule_Disp1 and Rule_Disp2) having conditions of attribute information for an event 601 UserID=10, Area=Minato-ku" and UserID=11, Area=Minato-ku" included in the event pattern of the processing rule 603 (Rule_PS1), respectively, as dispatch conditions. Similarly, the dispatch rule generation unit 103 generates dispatch rules 604 (Rule_Disp3 to 8) with respect to the processing rules 603 (Rule_PS2 to 4).

Note that, when "one or more conditions of the attribute information for an event 601" included in the event pattern of the processing rule 603 includes a plurality of conditions of attribution information, all the conditions may be set as the dispatch condition or a part of them may be set as the dispatch condition. For example, with respect to the event pattern of the event 601 (Rule_PS1), as mentioned above, by specifying all the conditions (UserID and Area) of the attribute information for an event 601, dispatch rules 604 having the conditions "UserID=10, Area=Minato-ku", and "UserID=11, Area=Minato-ku" as the dispatch condition, respectively, may be generated. Or, by specifying a part (Area) of the conditions of the attribute information for an event 601, a dispatch rule 604 having the condition "Area=Minato-ku" as the dispatch condition may be generated.

The dispatch rule setting unit 104 searches the dispatcher information 612 for dispatching target attribute information which matches the condition of attribute information included in the dispatch condition of the generated dispatch rule 604, and acquires the identifier of the dispatcher 300 to which the dispatching target attribute information has been assigned (step S115). The dispatch rule setting unit 104 sets the generated dispatch rule 604 to the dispatcher 300 (step S116).

For example, the dispatch rule setting unit 104, when setting the dispatch rule 604 (Rule_Disp1) shown in FIG. 9, acquires the identifier Disp1 of the dispatcher 300 to which the dispatching target attribute information matching the condition "Area=Minato-ku" included in the dispatch condition of the dispatch rule 604 (Rule_Disp1) has been assigned from dispatcher information 612 shown in FIG. 8. The dispatch rule setting unit 104 sets the dispatch rule 604 (Rule_Disp1) to the dispatcher 300 (Disp1). Similarly, the dispatch rule setting unit 104 sets the dispatch rules 604 (Rule_Disp2 to 4) to the dispatcher 300 (Disp1) and sets the dispatch rules 604 (Rule_Disp5 to 8) to the dispatcher 300 (Disp2).

As a result, as shown in FIG. 10, the dispatch rules 604 (Rule_Disp1 to 4) including the dispatch condition ("Area=Minato-ku") matching the dispatching target attribute information which has been assigned to the dispatcher 300 (Disp1) are set to the dispatcher 300 (Disp1). The dispatch rules 604 (Rule_Disp5 to 8) including the dispatch condition ("Area=Shinagawa-ku") matching the dispatching target attribute information which has been assigned to the dispatcher 300 (Disp2) are set to the dispatcher 300 (Disp2).

Next, operation of event processing in the first exemplary embodiment of the present invention will be described. FIG. 5 is a flow chart showing the operation of the event processing in the first exemplary embodiment of the present invention.

The event transmission unit 401 of the device 400 generates an event 601 based on detected information (step S201). The event transmission unit 401 acquires the identifier of the dispatcher 300 to which dispatching target attribute information matching the attribute information included in the event 601 has been assigned from the dispatcher information 621 (step S202). The event transmission unit 401 transmits the event 601 to the dispatcher 300 (step S203).

For example, as shown in FIG. 12, the event transmission unit 401 of the device 400 (Dev1) generates an event 601 (I11) including detected information "Area=Minato-ku, UserID=10" as attribute information.

The event transmission unit 401 acquires the identifier Disp1 of the dispatcher 300 to which dispatching target attribute information (Area=Minato-ku) matching the attribute information of the event 601 (I11) has been assigned from dispatcher information 621 shown in FIG. 11. The event transmission unit 401 transmits the event 601 (Ill) to the dispatcher 300 (Disp1).

The dispatcher 300, when receiving the event 601 from the device 400, searches the dispatch rule 604 for the dispatch condition that the attribute information of the event 601 satisfies, and acquires the identifier of the processing server 200 corresponding to the dispatch condition (step S211). The dispatcher 300 transmits the event 601 to the processing server 200 (step S212).

For example, the dispatcher 300 (Disp1), when receiving the event 601 (I11) from the device 400 (Dev1), searches the dispatch rule 604 shown in FIG. 10 for the dispatch condition that the attribute information of the event 601 (Ill) satisfies. In this case, because the attribute information of the event 601 (I11) satisfies the dispatch condition ("Area=Minato-ku, UserID=10") of the dispatch rule 604 (Rule_Disp1), the dispatcher 300 (Disp1) acquires the identifier PS1 of the processing server 200 corresponding to the dispatch condition. The dispatcher 300 (Disp1) transmits the event 601 (I11) to the processing server 200 (PS1).

The processing server 200, when receiving the event 601 from the dispatcher 300, acquires the identifier of the processing rule 603 corresponding to the event pattern including the condition that the attribute information of the event 601 satisfies from the processing rule 603 (step S221). The processing server 200, when receiving all the events 601 that satisfy the conditions of the event 601 included in the event pattern of the processing rule 603, performs the processing content of the processing rule 603 (step S222). The processing server 200 transmits the event processing result 602 to the application server 500 (Step S223).

For example, the processing server 200, when receiving the event 601 (I11) from the dispatcher 300 (Disp1), acquires the identifier Rule_PS1 of the processing rule 603 corresponding to the event pattern including the condition ("Area=Minato-ku, UserID=10") that the attribute information of the event 601 (I11) satisfies from the processing rule 603 shown in FIG. 6. The processing server 200, when receiving the event 601 (I21) which satisfies the other condition "Area=Minato-ku, UserID=11" of the attribute information included in the event pattern of the processing rule 603 (Rule_PS1), performs the processing content of the processing rule 603 (Rule_PS1). In this case, the processing content of the processing rule 603 (Rule_PS1) is "notify to AS1". Accordingly, the processing server 200 transmits the event 601 (I11) and the event 601 (I21) to the application server 500 (AS1) as an event processing result 602. With that, the operation of the first exemplary embodiment of the present invention is completed.

Figure 13:
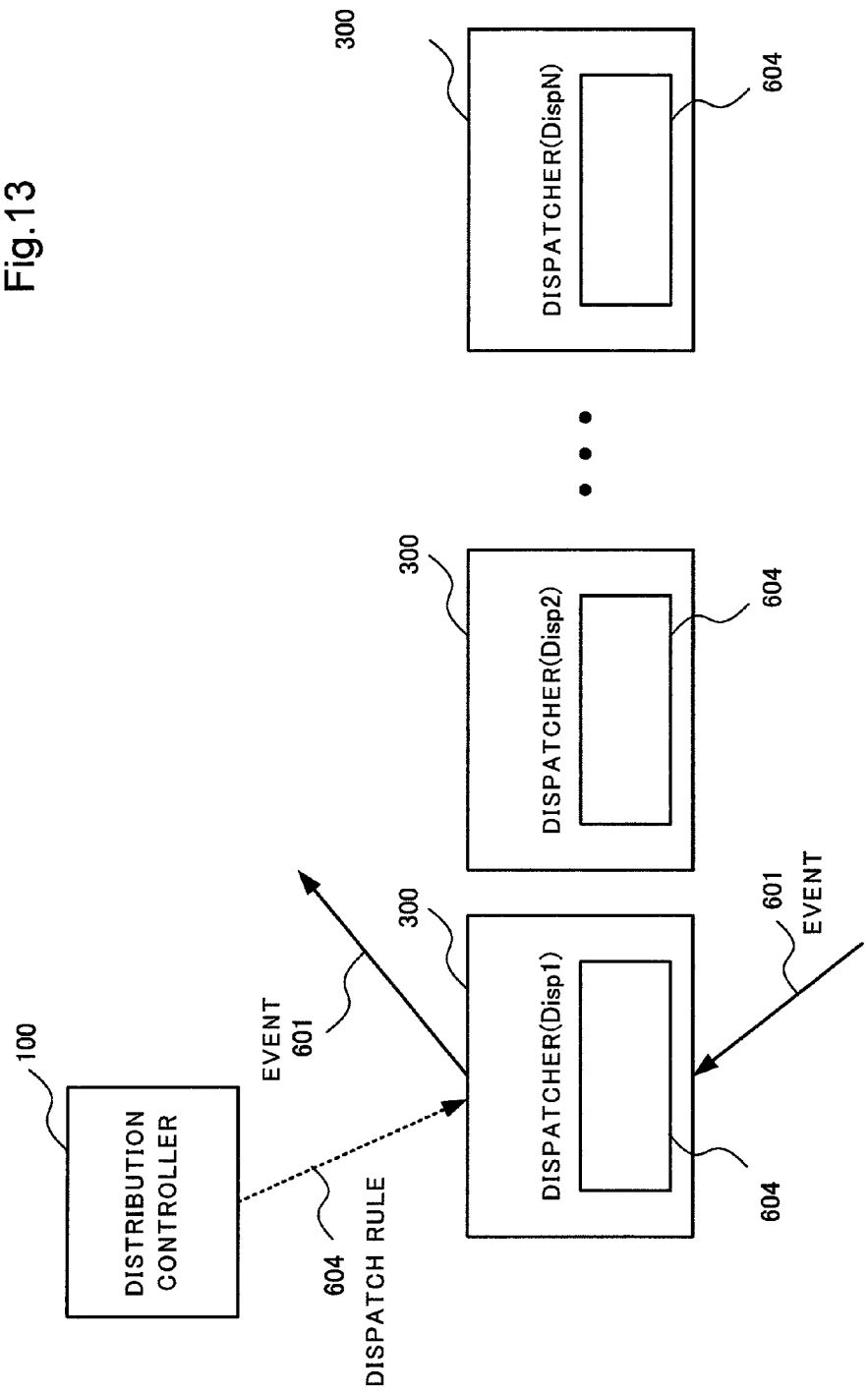
FIG. 13 A block diagram showing a characteristic configuration of the event processing system in the first exemplary embodiment of the present invention.

FIG. 13 is a block diagram showing a characteristic configuration of the event processing system in the first exemplary embodiment of the present invention.

An event processing system of the present invention includes a distribution controller 100 (distribution control means) and a plurality of dispatchers (dispatch means) 300. Dispatching target attribute information, that is attribute information included in an event 601 that is a dispatching target for each of the plurality of dispatchers 300, has been assigned to the each of the plurality of dispatchers 300. The distribution controller (distribution control means) 100 sets a dispatch rule 604 including a dispatch condition indicating one or more conditions of attribute information included in an event 601 and a destination of an event 601 that satisfies the dispatch condition to the dispatchers 300, to which the dispatching target attribute information matching any one of the conditions of attribute information included in the dispatch condition of the dispatch rule 604 has been assigned, among the plurality of dispatchers 300. The each of the plurality of dispatchers 300, when receiving an event 601, transmits the received event 601 to the destination corresponding to the dispatch condition when attribute information included in the received event 610 satisfies the dispatch condition, with reference to the dispatch rule 604.

Figure 33:
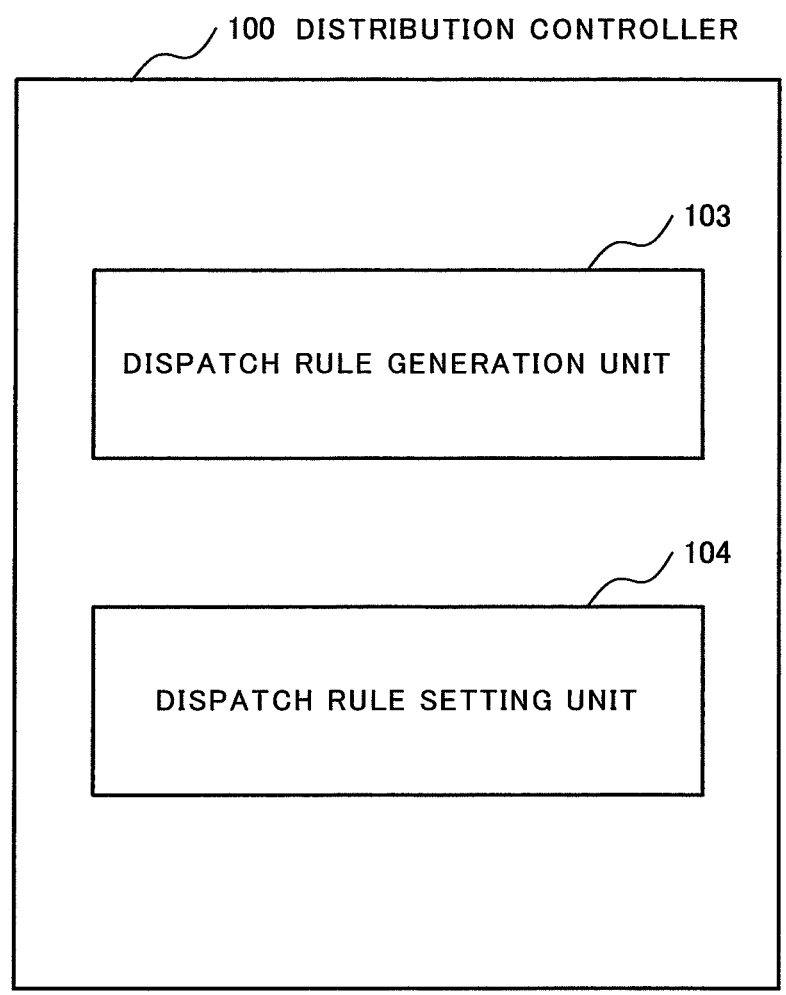
FIG. 33 A block diagram showing a characteristic configuration of the distribution controller in the first exemplary embodiment of the present invention.

FIG. 33 is a block diagram showing a characteristic configuration of the distribution controller in the first exemplary embodiment of the present invention.

A distribution controller 100 of the present invention includes a dispatch rule generation unit (dispatch rule generation means) 103 and a dispatch rule setting unit (dispatch rule setting means) 104. The dispatch rule generation unit 103 generates a dispatch rule 604 including a dispatch condition indicating one or more conditions of attribute information included in an event 601 and a destination of an event 601 that satisfies the dispatch condition. The dispatch rule setting unit 104 sets the dispatch rule 604 to a dispatcher 300, to which dispatching target attribute information matching any one of the conditions of attribute information included in the dispatch condition of the dispatch rule 604 has been assigned, among a plurality of the dispatcher 300.

Note that, in the first exemplary embodiment of the present invention, although a system in which the movable device 400 transmits the event 601 including the position information of the user as the detected information has been explained as an example, a system in which the event 601 including temperature, humidity, or tag information on the RFID is transmitted as the detected information may have a similar configuration and similarly operation. In this case, a range or a value of temperature, humidity, or the RFID tag may be assigned to each of the plurality of dispatchers 300 as the dispatching target attribute information.

In the first exemplary embodiment of the present invention, it is assumed that the dispatcher information 612 stored and managed in the dispatcher information storage unit 105 on the distribution controller 100 and the dispatcher information 621 stored and managed in the dispatcher information storage unit 402 on the device 400 are set by the system administrator or the like. However, the content of the dispatcher information 612 and the dispatcher information 621 may be stored and managed in the server or the like on the event processing system, and the distribution controller 100 and the device 400 may download the content of the dispatcher information 612 and the dispatcher information 621 from the server.

According to the first exemplary embodiment of the present invention, in the event processing system, the number of the dispatch rules 604 set to each dispatcher 300 can be reduced. The reason for this is that the dispatching target attribute information, that is the attribute information included in the event 601 that is a dispatching target for the dispatcher 300, has been assigned to each of the plurality of dispatchers 300, and the distribution controller 100 sets the dispatch rule 604 to the dispatcher 300 to which the dispatching target attribute information that satisfies the condition of the attribute information included in the dispatch condition of the dispatch rule 604 has been assigned.

Second Exemplary Embodiment

Next, a second exemplary embodiment of the present invention will be described in detail with reference to drawings.

In the second exemplary embodiment of the present invention, a distribution controller 110 includes a dispatch rule generation device 120 and a plurality of dispatch rule setting devices 130 arranged for each dispatcher group. This is a difference between the first exemplary embodiment of the present invention and the second exemplary embodiment of the present invention.

Further, in the second exemplary embodiment of the present invention, a component having the same reference number as the component in the first exemplary embodiment is the same as the component in the first exemplary embodiment, unless an explanation is especially given.

Figure 14:
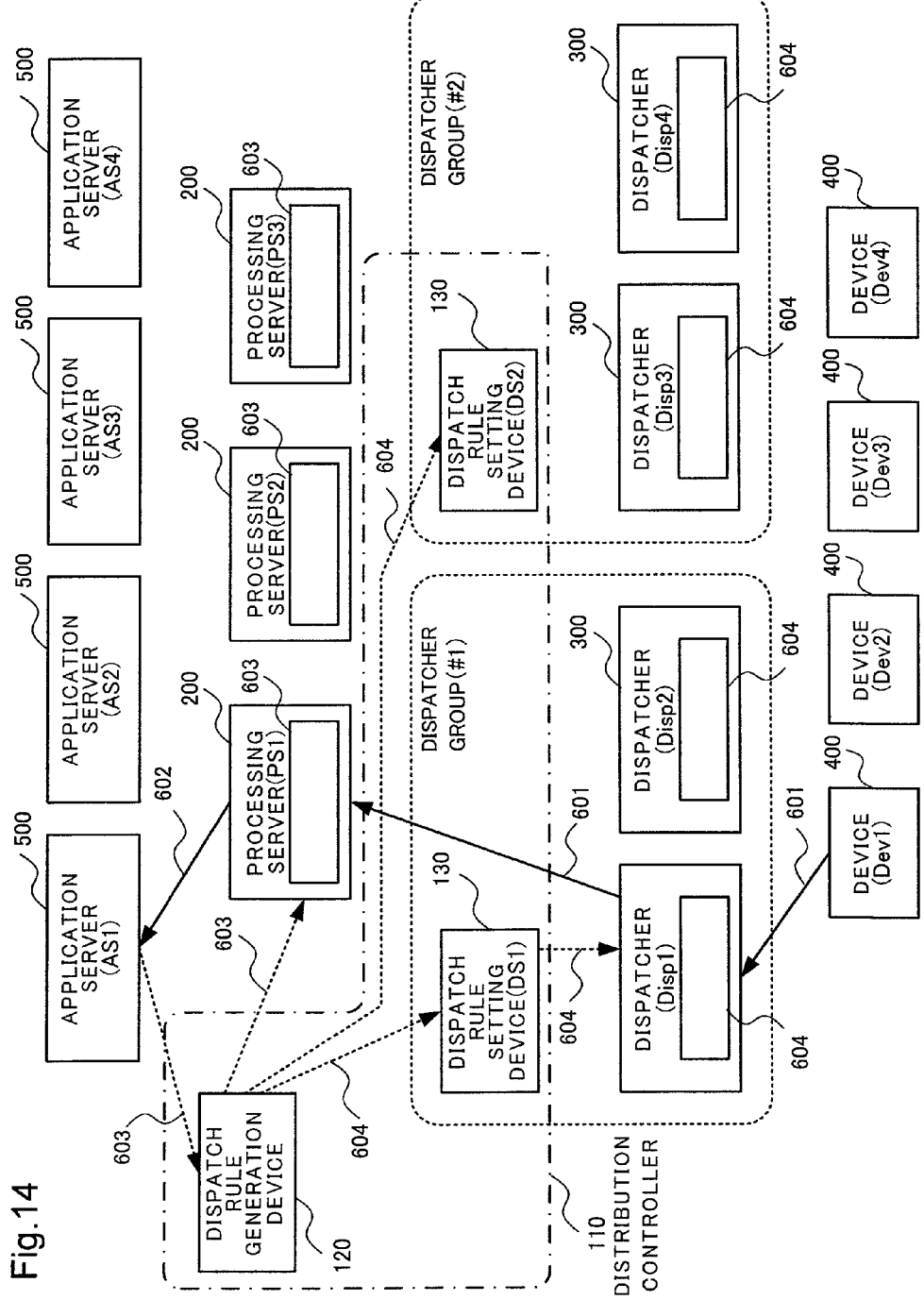
FIG. 14 A block diagram showing a configuration of a whole event processing system in a second exemplary embodiment of the present invention.

FIG. 14 is a block diagram showing a configuration of a whole event processing system in the second exemplary embodiment of the present invention. Referring to FIG. 14, the second exemplary embodiment of the event processing system of the present invention includes the distribution controller 110, the plurality of processing servers 200, the plurality of dispatchers 300, the device 400, and the application server 500. The distribution controller 110 includes the dispatch rule generation device 120 and the plurality of dispatch rule setting devices 130. The dispatch rule setting device 130 is arranged for each dispatcher group that includes one or more dispatchers 300.

In FIG. 14, the dispatcher group includes two dispatcher groups that have identifiers #1 and #2, respectively. As the plurality of dispatch rule setting devices 130, there are two dispatch rule setting devices whose identifiers are DS1 and DS2, respectively. The dispatch rule setting device 130 (DS1) is arranged in the dispatcher group (#1) and the dispatch rule setting device 130 (DS2) is arranged in the dispatcher group (#2). The dispatcher group (#1) includes two dispatchers 300 (Disp1 and Disp1), and the dispatcher group (#2) includes two dispatchers 300 (Disp3 and Disp4).

Note that, the number of the dispatcher groups and the number of the dispatchers 300 included in each dispatcher group are not limited to the above-mentioned numbers.

The dispatch rule generation device 120 sets the processing rule 603 received from the application server 500 to the processing server 200 and generates the dispatch rule 604 based on the processing rule 603. The dispatch rule setting device 130 sets the dispatch rule 604 to the dispatcher 300 in the dispatcher group.

Figure 15:
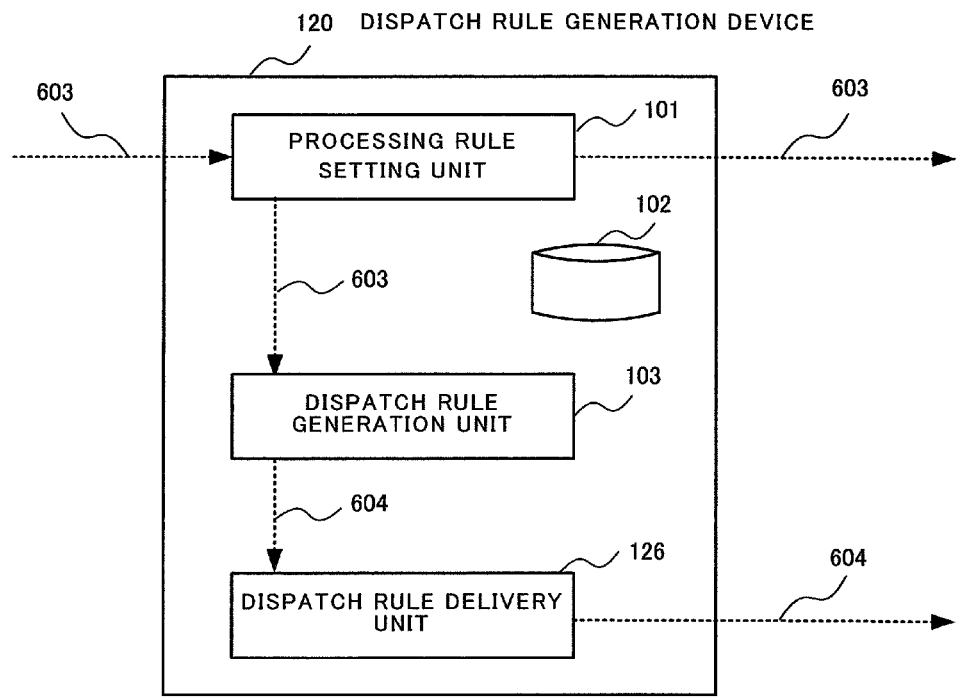
FIG. 15 A block diagram showing a configuration of a dispatch rule generation device 120 in the second exemplary embodiment of the present invention.

FIG. 15 is a block diagram showing a configuration of the dispatch rule generation device 120 in the second exemplary embodiment of the present invention. Referring to FIG. 15, the dispatch rule generation device 120 includes the processing rule setting unit 101, the processing rule setting information storage unit 102, the dispatch rule generation unit 103, and a dispatch rule delivery unit 126.

The dispatch rule delivery unit 126 transmits the dispatch rule 604 generated by the dispatch rule generation unit 103 to the dispatch rule setting device 130.

Figure 16:
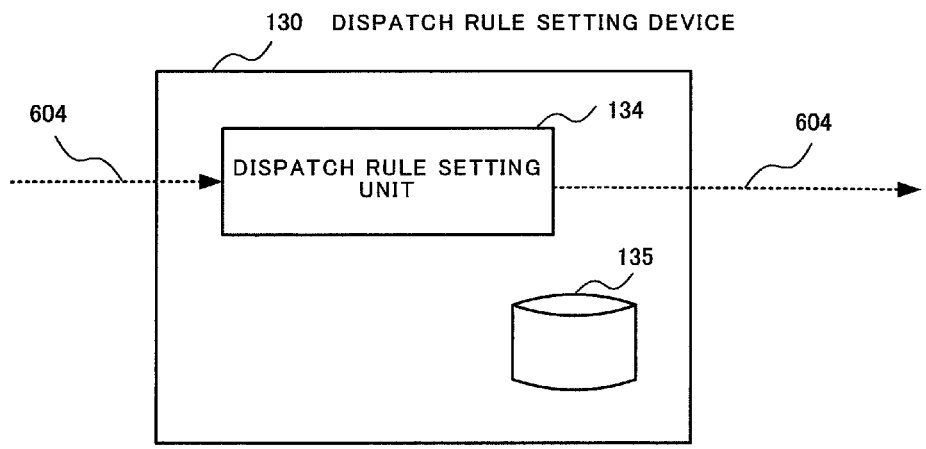
FIG. 16 A block diagram showing a configuration of a dispatch rule setting device 130 in the second exemplary embodiment of the present invention.

FIG. 16 is a block diagram showing a configuration of the dispatch rule setting device 130 in the second exemplary embodiment of the present invention. Referring to FIG. 16, the dispatch rule setting device 130 includes a dispatch rule setting unit 134 and a dispatcher information storage unit 135.

The dispatcher information storage unit 135 stores and manages dispatcher information 613. The dispatcher information 613 indicates the dispatching target attribute information that has been assigned to each dispatcher 300 in the dispatcher group to which the dispatch rule setting device 130 belongs. FIG. 18 is a figure showing an example of the dispatcher information 613 in the second exemplary embodiment of the present invention. As shown in FIG. 18, the dispatcher information 613 includes the dispatching target attribute information and the dispatcher identifiers Disp1 to 4 of the dispatcher 300 to which the dispatching target attribute information has been assigned. It is assumed that the dispatcher information 613 is set by the system administrator or the like. FIG. 18 shows an example of the dispatcher information 612 set to the dispatch rule setting device 130 (DS1) with respect to the dispatchers 300 (Disp 1 and Disp2) in the dispatcher group (#1) and the dispatcher information 612 set to the dispatch rule setting device 130 (DS2) with respect to the dispatchers 300 (Disp3 and Disp4) in the dispatcher group (#2).

The dispatch rule setting unit 134, determines the dispatcher 300 to which the dispatch rule 604 received from the dispatch rule generation device 120 to be set with reference to the dispatcher information 613, and sets the dispatch rule 604 to the dispatcher 300.

Figure 17:
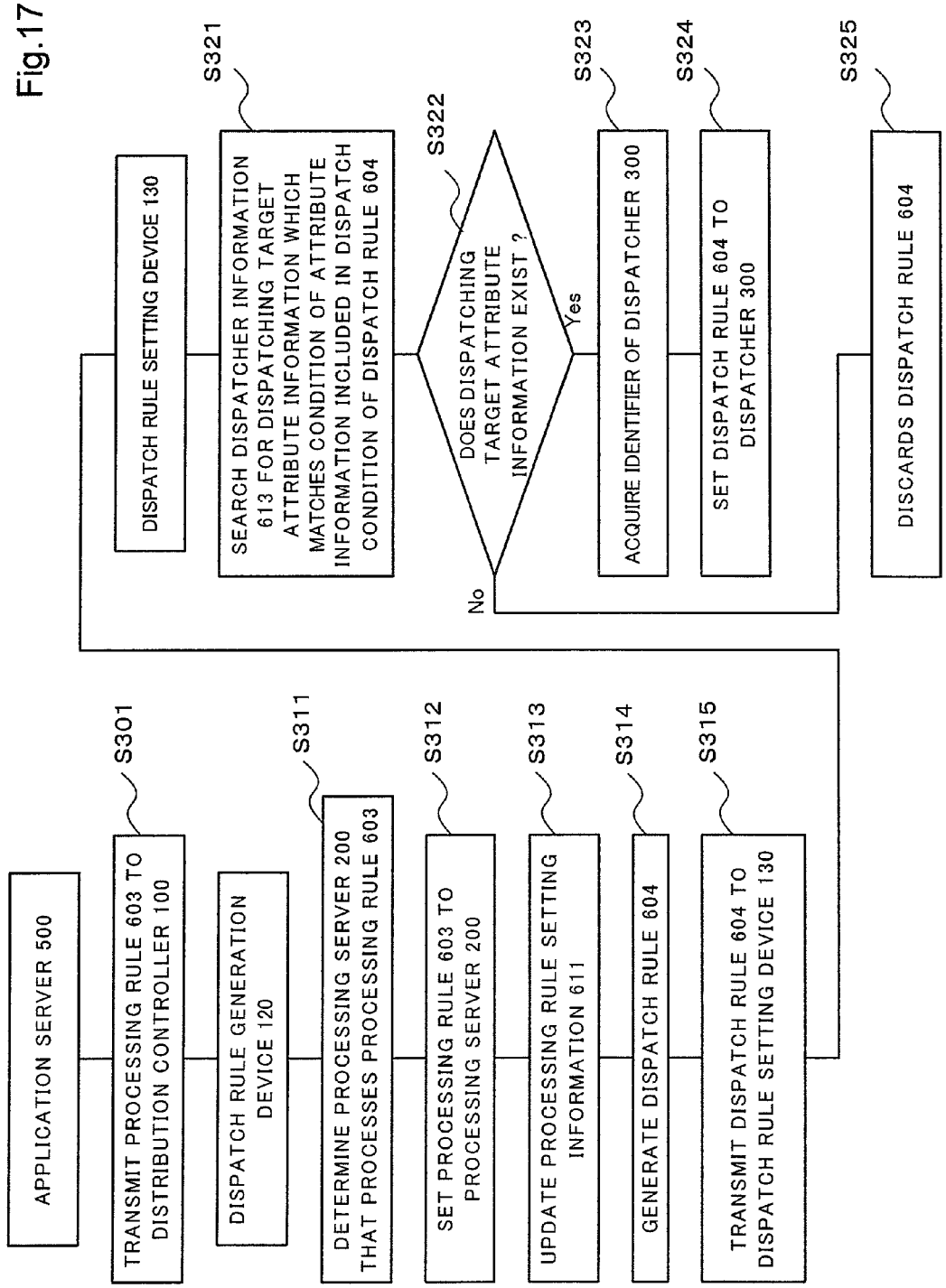
FIG. 17 A flow chart showing setting operation of a dispatch rule 604 in the second exemplary embodiment of the present invention.

Next, operation of the second exemplary embodiment of the present invention will be described with reference to drawings. FIG. 17 is a flow chart showing setting operation of the dispatch rule 604 in the second exemplary embodiment of the present invention.

When the dispatcher group has a configuration shown in FIG. 14, the dispatching target attribute information that has been assigned to each dispatcher 300 (Disp1 or Disp2) in the dispatcher group (#1) to which the dispatch rule setting device 130 (DS1) belongs is set in the dispatcher information 613 of the dispatch rule setting device 130 (DS1). The dispatching target attribute information that has been assigned to each dispatcher 300 (Disp3 or Disp4) in the dispatcher group (#2) to which the dispatch rule setting device 130 (DS2) belongs is set in the dispatcher information 613 of the dispatch rule setting device 130 (DS2).

The operations (steps S301 to S314) until the dispatch rule generation device 120 generates the dispatch rule 604 after the application server 500 transmits the processing rule 603 are the same as the operations (steps S101 to S114) of the application server 500 and the distribution controller 100 in the first exemplary embodiment of the present invention.

The dispatch rule delivery unit 126 transmits the dispatch rule 604 generated by the dispatch rule generation unit 103 to the dispatch rule setting device 130 (step S315).

For example, the dispatch rule delivery unit 126 transmits the dispatch rule 604 (Rule_Disp1) shown in FIG. 9 that is generated in the dispatch rule generation unit 103 to the dispatch rule setting devices 130 (DS1 and DS2).

The dispatch rule setting unit 134 of the dispatch rule setting device 130, when receiving the dispatch rule 604, searches the dispatcher information 613 for the dispatching target attribute information which matches the condition of the attribute information included in the dispatch condition of the dispatch rule 604 (step S321). Here, when the dispatching target attribute information which matches the condition of the attribute information included in the dispatch condition of the dispatch rule 604 exists (step S322/Yes), the dispatch rule setting unit 134 acquires the identifier of the dispatcher 300 to which the dispatching target attribute information has been assigned (step S323). The dispatch rule setting unit 134 sets the received dispatch rule 604 to the dispatcher 300 (step S324).

On the other hand, when the dispatching target attribute information which matches the condition of the attribute information included in the dispatch condition of the dispatch rule 604 does not exist (step S322/No), the dispatch rule setting unit 134 discards the received dispatch rule 604 (step S325).

For example, the dispatch rule setting unit 134 of the dispatch rule setting device 130 (DS1), when receiving the dispatch rule 604 (Rule_Disp1) shown in FIG. 9, searches the dispatcher information 613 shown in FIG. 18 for the dispatching target attribute information matching the condition "Area=Minato-ku" included in the dispatch condition of the dispatch rule 604 (Rule_Disp1). The dispatch rule setting unit 134 acquires the identifier Disp1 of the dispatcher 300 to which the dispatching target attribute information "Area=Minato-ku" has been assigned. The dispatch rule setting unit 134 of the dispatch rule setting device 130 (DS1) sets the dispatch rule 604 (Rule_Disp1) to the dispatcher 300 (Disp1).

On the other hand, when the dispatch rule setting device 130 (DS2) receives the dispatch rule 604 (Rule_Disp1), similarly, the dispatch rule setting unit 134 of the dispatch rule setting device 130 (DS2) searches the dispatcher information 613 shown in FIG. 18 for the dispatching target attribute information matching the condition "Area=Minato-ku". However, because the dispatching target attribute information matching the condition "Area=Minato-ku" does not exist, the dispatch rule setting unit 134 of the dispatch rule setting device 130 (DS2) discards the dispatch rule 604 (Rule_Disp1).

The operation of the event processing in the second exemplary embodiment of the present invention is the same as the operation (FIG. 5) of the event processing in the second exemplary embodiment of the present invention.

With that, the operation of the second exemplary embodiment of the present invention is completed.

According to the second exemplary embodiment of the present invention, in the event processing system, the processing load in the distribution controller 110 can be reduced. The reason for this is that the distribution controller 110 includes the dispatch rule generation device 120 and the plurality of dispatch rule setting devices 130 arranged for each dispatcher group, the dispatch rule generation device 120 sets the processing rule 603 to the processing server 200 and generates the dispatch rule 604, and the dispatch rule setting device 130 sets the dispatch rule 604 to the dispatcher 300 in the dispatcher group to which the own dispatch rule setting device 130 belongs.

Third Exemplary Embodiment

Next, a third exemplary embodiment of the present invention will be described in detail with reference to drawings.

In the first exemplary embodiment of the present invention, the same content is set to both the dispatcher information 612 in the distribution controller 100 and the dispatcher information 621 in the device 400. For this reason, in case many dispatchers 300 are arranged or the dispatching target attribute information assigned to the dispatcher 300 is subdivided, for example, data amounts of the dispatcher information 612 and the dispatcher information 621 become large.

In the third exemplary embodiment of the present invention, a device 410 acquires the content to be set in dispatcher information 622 from a distribution controller 140 and whereby, the data amount of the dispatcher information 622 is reduced.

In the third exemplary embodiment of the present invention, the device 410 acquires the content to be set in the dispatcher information 622 from the distribution controller 140. This is a difference between the first exemplary embodiment of the present invention and the third exemplary embodiment of the present invention.

Note that, in the third exemplary embodiment of the present invention, a component having the same reference number as the component in the first exemplary embodiment is the same as the component in the first exemplary embodiment, unless an explanation is especially given.

Figure 19:
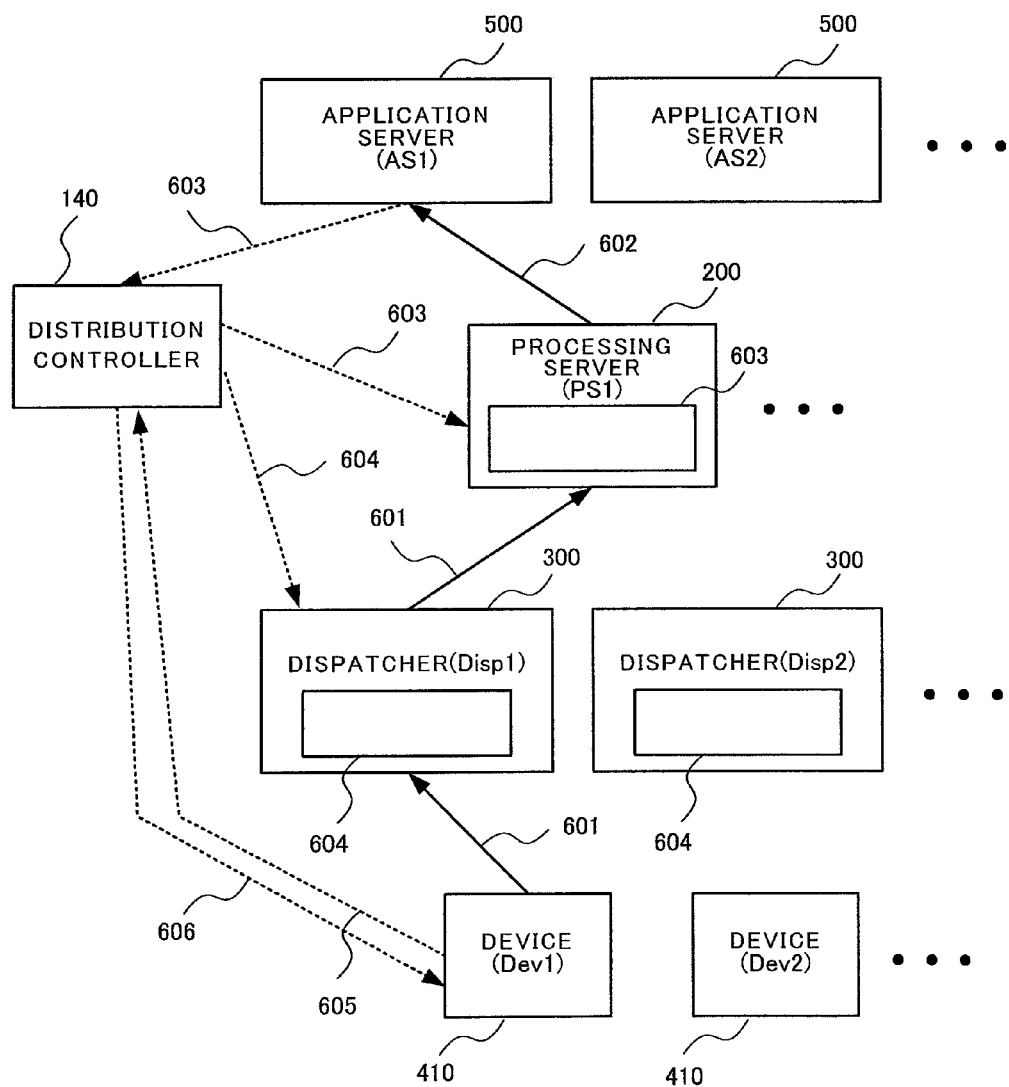
FIG. 19 A block diagram showing a configuration of a whole event processing system in a third exemplary embodiment of the present invention.

FIG. 19 is a block diagram showing a configuration of a whole event processing system in the third exemplary embodiment of the present invention. Referring to FIG. 19, the third exemplary embodiment of the event processing system of the present invention includes the distribution controller 140, the plurality of processing servers 200, the plurality of dispatchers 300, the device 410, and the application server 500.

Figure 20:
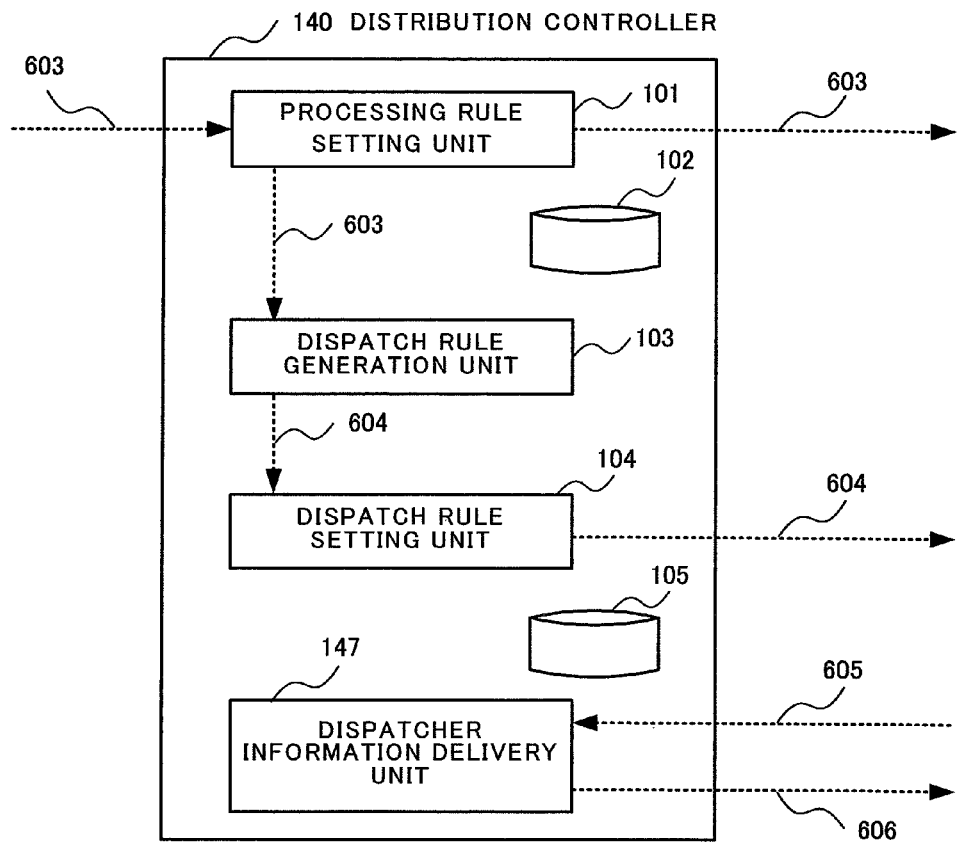
FIG. 20 A block diagram showing a configuration of a distribution controller 140 in the third exemplary embodiment of the present invention.

FIG. 20 is a block diagram showing a configuration of the distribution controller 140 in the third exemplary embodiment of the present invention. Referring to FIG. 20, the distribution controller 140 includes the processing rule setting unit 101, the processing rule setting information storage unit 102, the dispatch rule generation unit 103, the dispatch rule setting unit 104, the dispatcher information storage unit 105, and a dispatcher information delivery unit 147.

The dispatcher information delivery unit 147, when receiving a dispatcher information acquisition request 605 from the device 41Q, transmits the identifier of the dispatcher 300 to which the dispatching target attribute information included in the dispatcher information acquisition request 605 has been assigned to the device 410 as a dispatcher information acquisition response 606.

Figure 21:
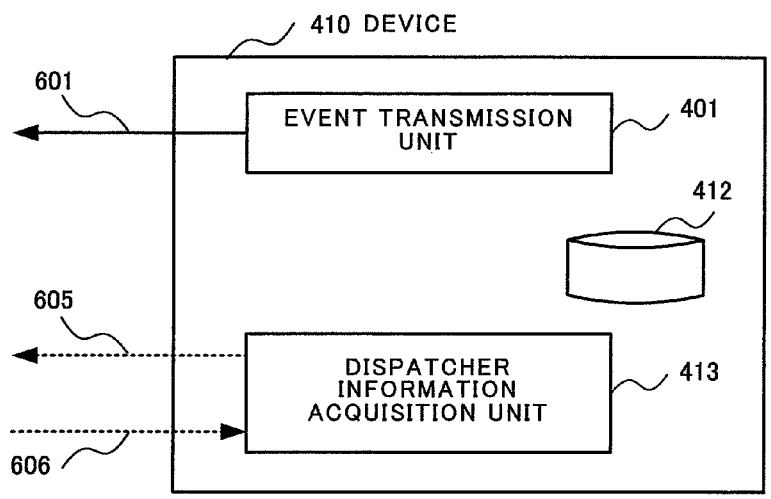
FIG. 21 A block diagram showing a configuration of a device 410 in the third exemplary embodiment of the present invention.

FIG. 21 is a block diagram showing a configuration of the device 410 in the third exemplary embodiment of the present invention. Referring to FIG. 21, the device 410 includes the event transmission unit 401, a dispatcher information storage unit 412, and a dispatcher information acquisition unit 413.

Figure 25:
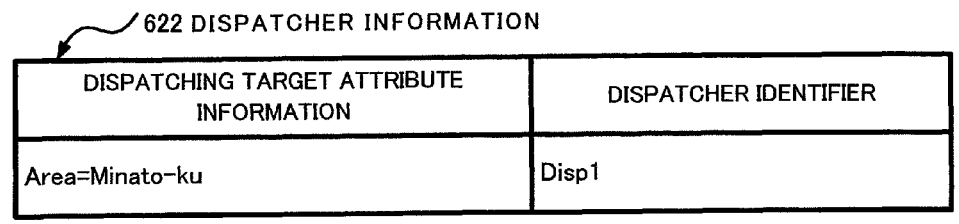
FIG. 25 A figure showing an example of dispatcher information 622 in the third exemplary embodiment of the present invention.

The dispatcher information storage unit 412 stores and manages the dispatcher information 622. The dispatcher information 622 indicates the dispatching target attribute information that has been assigned to each dispatcher 300 like the dispatcher information 621 of the device 400 in the first exemplary embodiment of the present invention. FIG. 25 is a figure showing an example of the dispatcher information 622 in the third exemplary embodiment of the present invention. FIG. 25 shows an example of the dispatcher information 622 set to the device 400 (Dev1). In the third exemplary embodiment of the present invention, it is assumed that the content of the dispatcher information 622 is acquired from the distribution controller 140 and set. Here, it is assumed that the number of combinations of the dispatching target attribute information and the identifier of the dispatcher 300 that are set in the dispatcher information 622 is one and the latest combination acquired from the distribution controller 140 is set in the dispatcher information 622.

The dispatcher information acquisition unit 413 acquires the combination of the dispatching target attribute information and the identifier of the dispatcher 300 to which the dispatching target attribute information has been assigned from the distribution controller 140 and sets it to the dispatcher information 622.

Next, operation of the third exemplary embodiment of the present invention will be described with reference to drawings.

The setting operation of the dispatch rule 604 in the third exemplary embodiment of the present invention is the same as the setting operation (FIG. 4) of the dispatch rule 604 in the first exemplary embodiment of the present invention.

Figure 22:
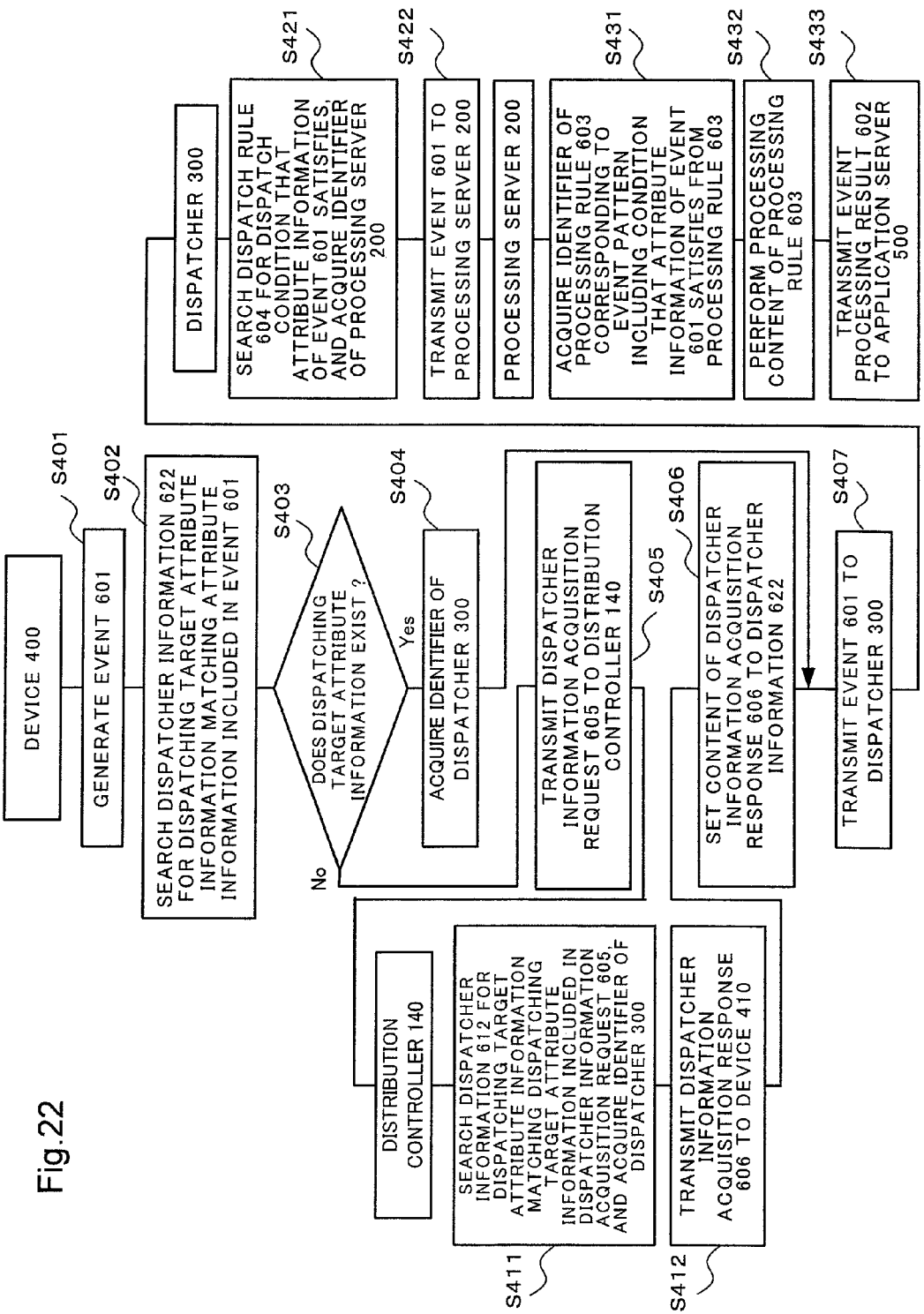
FIG. 22 A flow chart showing operation of event processing in the third exemplary embodiment of the present invention.

FIG. 22 is a flow chart showing operation of event processing in the third exemplary embodiment of the present invention.

The event transmission unit 401 of the device 410 generates an event 601 based on detected information (step S401). The event transmission unit 401 searches the dispatcher information 622 for the dispatching target attribute information matching the attribute information included in the event 601 (step S402). Here, when the dispatching target attribute information matching the attribute information included in the event 601 exists (step S403/Yes), the event transmission unit 401 acquires the identifier of the dispatcher 300 to which the dispatching target attribute information has been assigned (step S404) and transmits the event 601 to the dispatcher 300 (step S407).

On the other hand, when the dispatching target attribute information matching the attribute information included in the event 601 does not exist (step S403/No), the dispatcher information acquisition unit 413 transmits the dispatcher information acquisition request 605 to the distribution controller 140 (step S405). Here, it is assumed that a type of the attribute information that has been assigned to the dispatcher 300 as the dispatching target attribute information is set to the device 410. It is also assumed that the dispatcher information acquisition unit 413 sets the attribute information corresponding to the type, among the attribute information of the event 601, to the dispatcher information acquisition request 605.

Figure 23:
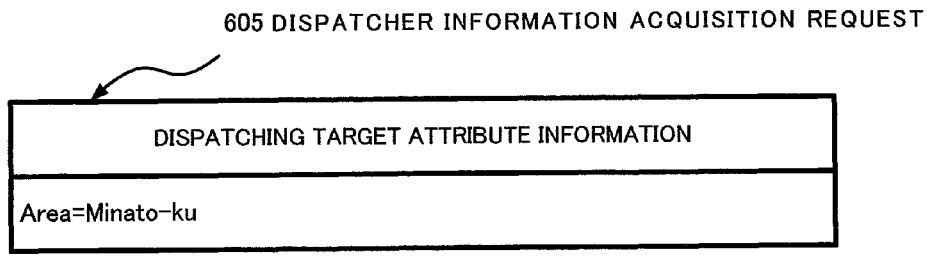
FIG. 23 A figure showing an example of a dispatcher information acquisition request 605 in the third exemplary embodiment of the present invention.

For example, when the event transmission unit 401 of the device 410 (Dev1) generates an event 601 (I11) as shown in FIG. 12 and the dispatching target attribute information matching the attribute information of the event 601 (I11) does not exist in the dispatcher information 622, the dispatcher information acquisition unit 413 transmits a dispatcher information acquisition request 605 shown in FIG. 23 to the distribution controller 140. Here, it is assumed that the position information (Area) is set to the device 410 as the type of the dispatching target attribute information that has been assigned to the dispatcher 300. The dispatcher information acquisition unit 413 sets the condition "Area=Minato-ku" among the attribute information of the event 601 (I11) to the dispatcher information acquisition request 605 as the dispatching target attribute information.

When the distribution controller 140 receives the dispatcher information acquisition request 605 from the device 410, the dispatcher information delivery unit 147 searches the dispatcher information 612 for the dispatching target attribute information matching the dispatching target attribute information included in the dispatcher information acquisition request 605. The dispatcher information delivery unit 147 acquires the identifier of the dispatcher 300 to which the dispatching target attribute information has been assigned (step S411). The dispatcher information delivery unit 147 transmits the dispatcher information acquisition response 606 including the dispatching target attribute information and the acquired identifier of the dispatcher 300 to the device 410 (step S412).

For example, when the distribution controller 140 receives the dispatcher information acquisition request 605 as shown in FIG. 23 from the device 410 (Dev1), the dispatcher information delivery unit 147 acquires the identifier Disp1 of the dispatcher 300 to which the dispatching target attribute information (Area=Minato-ku) has been assigned from the dispatcher information 612 shown in FIG. 8. The dispatcher information delivery unit 147 transmits a dispatcher information acquisition response 606 as shown in FIG. 24 that includes the dispatching target attribute information (Area=Minato-ku) and the acquired identifier Disp1 of the dispatcher 300 to the device 410 (Dev1).

When the device 410 receives the dispatcher information acquisition response 606 from the distribution controller 140, the dispatcher information acquisition unit 413 sets the dispatching target attribute information and the identifier of the dispatcher 300 that are included in the dispatcher information acquisition response 606 in the dispatcher information 622 (step S406). The event transmission unit 401 transmits the event 601 to the dispatcher 300 (step S407).

Figure 24:
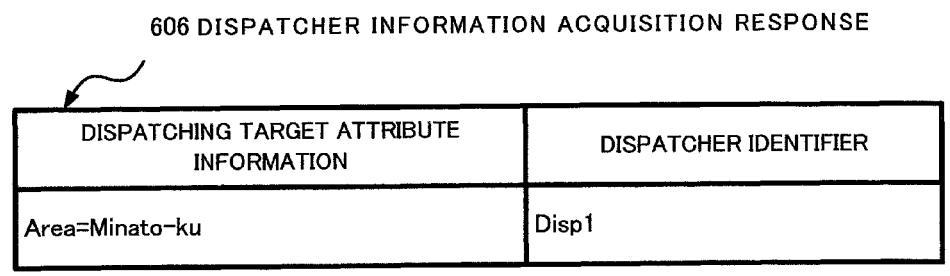
FIG. 24 An example of a dispatcher information acquisition response 606 in the third exemplary embodiment of the present invention.

For example, when the device 410 (Dev1) receives the dispatcher information acquisition response 606 as shown in FIG. 24 from the distribution controller 140, the dispatcher information acquisition unit 413 sets the dispatching target attribute information (Area=Minato-ku) and the identifier Disp1 of the dispatcher 300 that are included in the dispatcher information acquisition response 606 in the dispatcher information 622. As a result, the dispatcher information 622 of the device 410 (Dev1) as shown in FIG. 25 is obtained. The event transmission unit 401 transmits the event 601 (I11) to the dispatcher 300 (Disp1).

After this, the operations (steps S421 to S433) until the processing server 200 transmits the event processing result 602 to the application server 500 after the dispatcher 300 receives the event 601 are the same as the operations (steps S211 to S223) in the first exemplary embodiment of the present invention.

Note that, here, although the number of "combinations of the dispatching target attribute information and the identifier of the dispatcher 300" that are set in the dispatcher information 622 is one, the maximum number of combinations may be N and the latest N combinations received from the distribution controller 140 may be held in the dispatcher information 622.

Further, in the third exemplary embodiment of the present invention, although the device 410 acquires the content to be set in the dispatcher information 622 from the distribution controller 140, the content that is the same as the dispatcher information 612 may be stored and managed on the server or the like in the event processing system, and the device 410 may acquire the content set in the dispatcher information 622 from the server. In this case, the distribution controller 140 may also download the content of the dispatcher information 612 from the server.

According to the third exemplary embodiment of the present invention, in the event processing system, the data amount (the number of combinations of the dispatching target attribute information and the identifier of the dispatcher 300) of the dispatcher information 622 held by the device 410 can be reduced. The reason for this is that when the dispatching target attribute information which matching the attribute information of the event 601 does not exist in the dispatcher information 622, the device 410 acquires the content to be set in the dispatcher information 622 from the distribution controller 140.

Fourth Exemplary Embodiment

Next, a fourth exemplary embodiment of the present invention will be described in detail with reference to drawings.

In the fourth exemplary embodiment of the present invention, a distribution controller 150 transmits, not only the identifier of the dispatcher 300 to which the dispatching target attribute information included in the dispatcher information acquisition request 605 has been assigned, but also the identifier of the dispatcher 300 to which the other dispatching target attribute information related to the dispatching target attribute information has been assigned, to the device 410 as the dispatcher information acquisition response 606. This is a difference between the third exemplary embodiment of the present invention and the fourth exemplary embodiment of the present invention.

Note that, in the fourth exemplary embodiment of the present invention, a component having the same reference number as that in the third exemplary embodiment is the same as the component in the third exemplary embodiment, unless an explanation is especially given.

Figure 26:
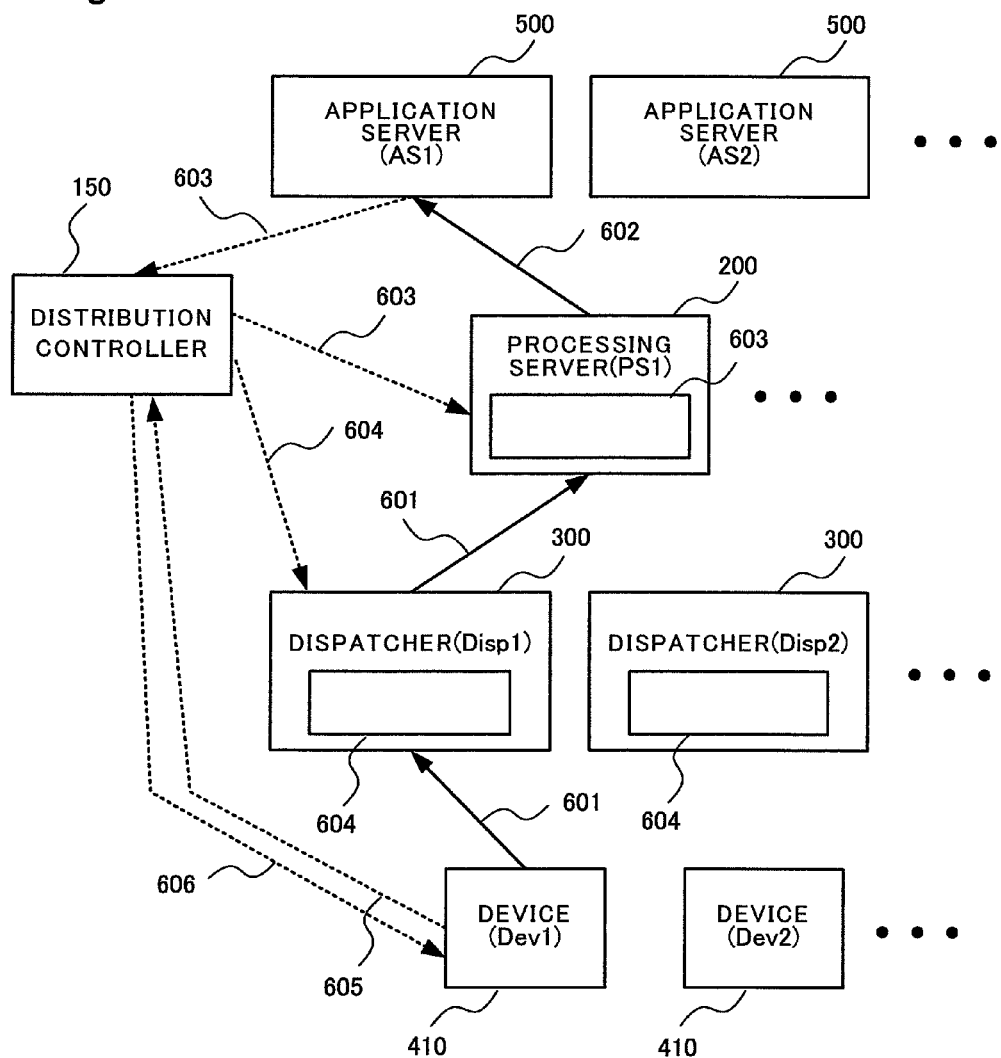
FIG. 26 A block diagram showing a configuration of a whole event processing system in a fourth exemplary embodiment of the present invention.

FIG. 26 is a block diagram showing a configuration of a whole event processing system in the fourth exemplary embodiment of the present invention. Referring to FIG. 26, the fourth exemplary embodiment of the event processing system of the present invention includes the distribution controller 150, the plurality of processing servers 200, the plurality of dispatchers 300, the device 410, and the application server 500.

Figure 27:
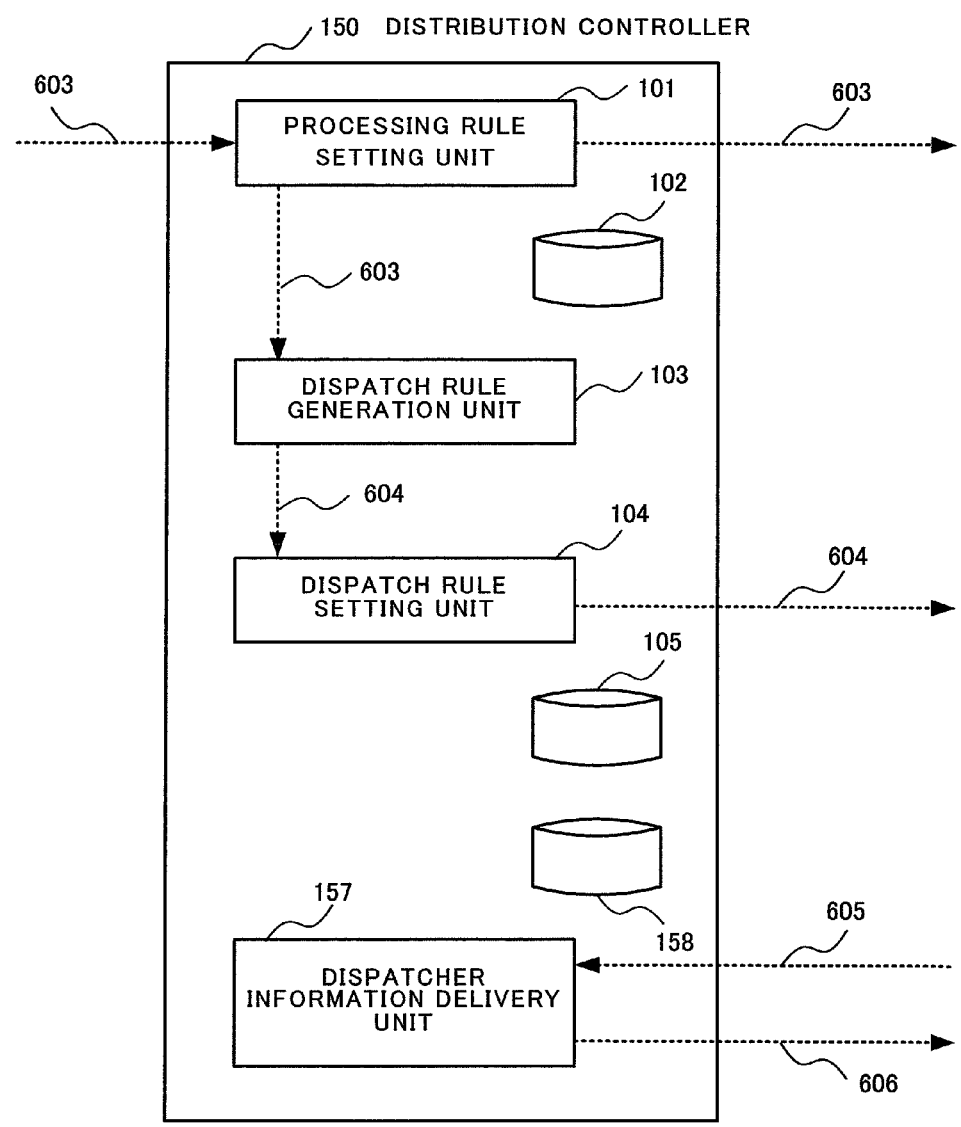
FIG. 27 A block diagram showing a configuration of a distribution controller 150 in the fourth exemplary embodiment of the present invention.

FIG. 27 is a block diagram showing a configuration of the distribution controller 150 in the fourth exemplary embodiment of the present invention. Referring to FIG. 27, the distribution controller 150 includes the processing rule setting unit 101, the processing rule setting information storage unit 102, the dispatch rule generation unit 103, the dispatch rule setting unit 104, the dispatcher information storage unit 105, a dispatcher information delivery unit 157, and an inter-dispatching target attributes relation information storage unit 158.

The inter-dispatching target attributes relation information storage unit 158 stores and manages inter-dispatching target attributes relation information 614. The inter-dispatching target attributes relation information 614 indicates the other dispatching target attribute information related to the dispatching target attribute information. FIG. 29 is a figure showing an example of the inter-dispatching target attributes relation information 614 in the fourth exemplary embodiment of the present invention. As shown in FIG. 29, the inter-dispatching target attributes relation information 614 includes the dispatching target attribute information and related dispatching target attribute information that indicates the other dispatching target attribute information related to the dispatching target attribute information. It is assumed that the inter-dispatching target attributes relation information 614 is set by the system administrator or the like. FIG. 29 shows an example of the inter-dispatching target attributes relation information 614 set to the distribution controller 150.

Here, a value having a high possibility of being taken as a value of the attribute information of the next event 601 to the event 601 generated in the device 410 including a value of the attribute information indicated by the dispatching target attribute information, is set as the related dispatching target attribute information.

For example, a surrounding position to which the device 410 may move next from the position indicated by the dispatching target attribute information is set as the related dispatching target attribute information in the inter-dispatching target attributes relation information 614 shown in FIG. 29.

Note that, when the dispatching target attribute information is specified as "range of temperature or humidity", for example, higher or lower "range of temperature or humidity" than "range of temperature or humidity" indicated by the dispatching target attribute information may be set as the related dispatching target attribute information.

The dispatcher information delivery unit 157, when receiving the dispatcher information acquisition request 605 from the device 410, transmits, in addition to the identifier of the dispatcher 300 to which the dispatching target attribute information included in the dispatcher information acquisition request 605 has been assigned, the identifier of the dispatcher 300 to which the other dispatching target attribute information related to the dispatching target attribute information has been assigned to the device 410 as the dispatcher information acquisition response 606.

Here, it is assumed that as the dispatcher information 622 of the device 410, "the combinations of the dispatching target attribute information and the identifier of the dispatcher 300" that are included in the latest dispatcher information acquisition response 606 received from the distribution controller 150 are set in the dispatcher information 622.

Next, operation of the fourth exemplary embodiment of the present invention will be described with reference to drawings.

Figure 28:
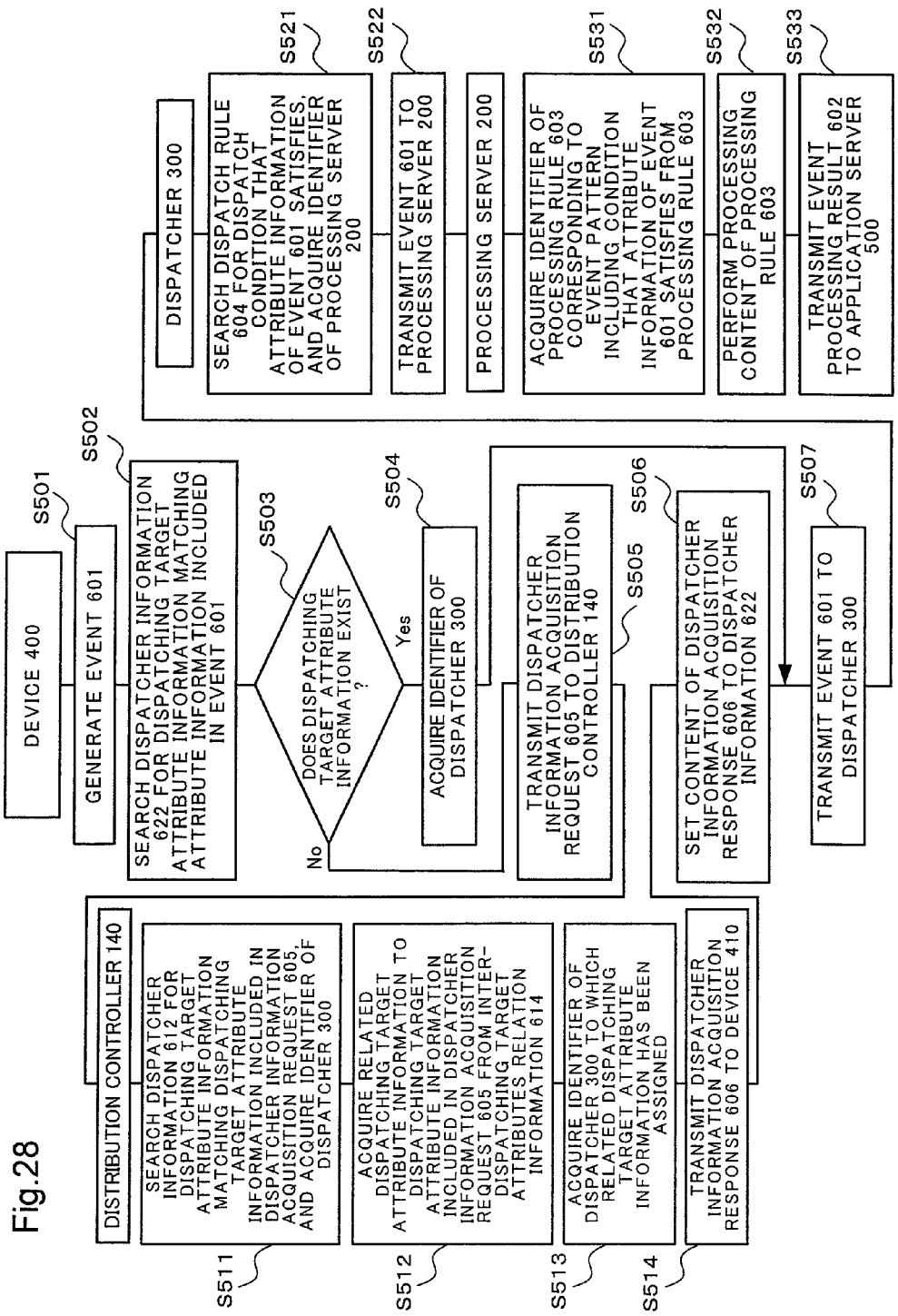
FIG. 28 A flow chart showing operation of event processing in the fourth exemplary embodiment of the present invention.
Figure 32:
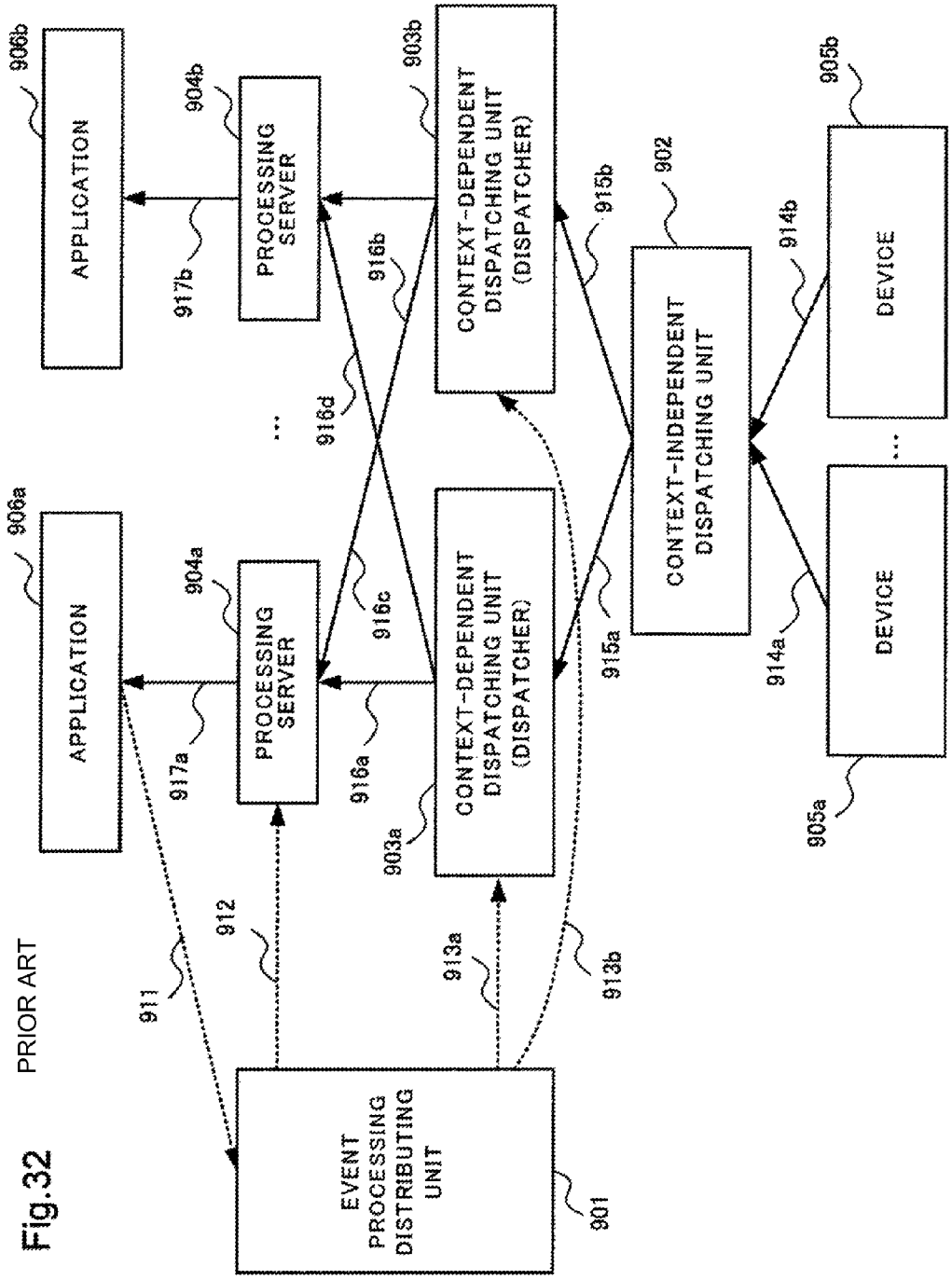
FIG. 32 A figure showing a configuration of a load distributing and dispatching system described in Japanese Patent Publication No. 4161998.

FIG. 28 is a flow chart showing operation of event processing in the fourth exemplary embodiment of the present invention.

First, the operations (steps S501 to S505) until the dispatcher information acquisition request 605 is transmitted after the device 410 generates the event 601 are the same as the operations (steps S401 to S405) of the third exemplary embodiment of the present invention.

When the distribution controller 150 receives the dispatcher information acquisition request 605 from the device 410, the dispatcher information delivery unit 157 searches the dispatcher information 612 for the dispatching target attribute information matching the dispatching target attribute information included in the dispatcher information acquisition request 605. The dispatcher information delivery unit 157 acquires the identifier of the dispatcher 300 to which the dispatching target attribute information has been assigned (step S511). Next, the dispatcher information delivery unit 157 acquires the related dispatching target attribute information to the dispatching target attribute information included in the dispatcher information acquisition request 605 from the inter-dispatching target attributes relation information 614 (step S512). The dispatcher information delivery unit 157 acquires the identifier of the dispatcher 300 to which the acquired related dispatching target attribute information is assigned from the dispatcher information 612 (step S513). The dispatcher information delivery unit 157 transmits the dispatcher information acquisition response 606 that includes the dispatching target attribute information included in the dispatcher information acquisition request 605, the identifier of the dispatcher 300 acquired in step S511 for the dispatching target attribute information, the related dispatching target attribute information acquired in step S512 to the dispatching target attribute information, and the identifier of the dispatcher 300 acquired in step S513 for the related dispatching target attribute information to the device 410 (step S514).

For example, when the distribution controller 150 receives the dispatcher information acquisition request 605 as shown in FIG. 23 from the device 410 (Dev1), the dispatcher information delivery unit 157 acquires the identifier Disp1 of the dispatcher 300 to which the dispatching target attribute information (Area=Minato-ku) has been assigned from the dispatcher information 612 shown in FIG. 8. The dispatcher information delivery unit 157 acquires related dispatching target attribute information (Area=Shinagawa-ku, Chiyoda-ku) to the dispatching target attribute information (Area=Minato-ku) included in the dispatcher information acquisition request 605 from the inter-dispatching target attributes relation information 614 shown in FIG. 29. The dispatcher information delivery unit 157 acquires the identifiers (Disp2 for Area=Shinagawa-ku and Disp3 for Area=Chiyoda-ku) of the dispatcher 300 to which the related dispatching target attribute information has been assigned from the dispatcher information 612 shown in FIG. 8. The dispatcher information delivery unit 157 transmits the dispatcher information acquisition response 606 as shown in FIG. 30 including these combinations of the dispatching target attribute information and the identifier of the dispatcher 300 to the device 410 (Dev1).

The device 410, when receiving the dispatcher information acquisition response 606 from the distribution controller 150, the dispatcher information acquisition unit 413 sets the combinations of the dispatching target attribute information and the identifier of the dispatcher 300 that are included in the dispatcher information acquisition response 606 in the dispatcher information 622 (step S506).

As a result, as shown in FIG. 31, in the dispatcher information 622 of the device 410, not only the Identifier of the dispatcher 300 to which the dispatching target attribute information requested by the dispatcher information acquisition request 605 has been assigned, but also the identifier of the dispatcher 300 to which the other dispatching target attribute information related to the dispatching target attribute information acquired through the dispatcher information acquisition response 606 has been assigned is set. Accordingly, after this, the event transmission unit 401 of the device 410 can acquire the identifier of the dispatcher 300 with respect to the other dispatching target attribute information related to the dispatching target attribute information requested in the dispatcher information acquisition request 605, with reference to the dispatcher information 622, without requesting the distribution controller 150 to send it.

For example, when the device 410 (Dev1) receives the dispatcher information acquisition response 606 as shown in FIG. 30 from the distribution controller 150, not only the identifier of the dispatcher 300 to which the dispatching target attribute information (Area=Minato-ku) requested in the dispatcher information acquisition request 605 has been assigned, but also the identifiers of the dispatcher 300 to which the surrounding other dispatching target attribute information (Area=Shinagawa-ku, Chiyoda-ku) related to the dispatching target attribute information have been assigned is also set in the dispatcher information 622, as shown in FIG. 31.

Accordingly, the device 410 (Dev1), even if it moves from Minato-ku to Shinagawa-ku or Chiyoda-ku that is a surrounding area of Minato-ku, can acquire the identifier of the dispatcher 300 to which "Area=Shinagawa-ku, or Chiyoda-ku" has been assigned with reference to the dispatcher information 622, without requesting the distribution controller 150 to send it.

After this, the operations (steps S507 and S521 to S533) until the processing server 200 transmits the event processing result 602 to the application server 500 after the device 410 transmits the event 601 are the same as the operations (steps S407 and S421 to S433) of the third exemplary embodiment of the present invention.

According to the fourth exemplary embodiment of the present invention, in the event processing system, the number of times of inquiries from the device 410 to the distribution controller 150, with respect to the content to be set in the dispatcher information 622, can be reduced. The reason for this is that the distribution controller 150 transmits, not only the identifier of the dispatcher 300 to which the dispatching target attribute information included in the dispatcher information acquisition request 605 has been assigned, but also the identifier of the dispatcher 300 to which the other dispatching target attribute information related to the dispatching target attribute information has been assigned to the device 410 as the dispatcher information acquisition response 606.

The advantageous effect of the present invention is that the number of the dispatch rules set to each dispatcher can be reduced in an event processing system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-171860, filed on Jul. 23, 2009, the disclosure of which is incorporated herein in its entirety by reference.

INDUSTRIAL APPLICABILITY

The present invention can be applied to an event processing system which performs processing of events generated by devices or the like, such as RFIDs or sensors.

The invention claimed is:

1. An event processing system comprising a distribution controller and a plurality of dispatchers, wherein
    a dispatching target attribute, that is an attribute included in an event that is a dispatching target for each of said plurality of dispatchers, has been assigned to said each of said plurality of dispatchers,
    said distribution controller sets a dispatch rule including a dispatch condition indicating one or more conditions of attributes included in an event and a destination of an event that satisfies said dispatch condition to said dispatcher, to which said dispatching target attribute matching any one of said conditions of attributes included in said dispatch condition of said dispatch rule has been assigned, among said plurality of dispatchers,
    said each of said plurality of dispatchers, when receiving an event, transmits said received event to said destination corresponding to said dispatch condition when said received event satisfies said dispatch condition, with reference to said dispatch rule, and
    a device that transmits an event to said dispatcher, to which said dispatching target attribute matching any one of attributes included in said transmitting event has been assigned, among said plurality of dispatchers, wherein
    said distribution controller stores first dispatcher information indicating an identifier of said dispatcher to which said dispatching target attribute has been assigned,
    said device stores second dispatcher information indicating said identifier of said dispatcher to which said dispatching target attribute has been assigned,
    said distribution controller acquires said identifier of said dispatcher to which said dispatch rule to be set from said first dispatcher information, and
    said device acquires said identifier of said dispatcher to which said transmitting event to be transmitted from said second dispatcher information.

2. The event processing system according to claim 1 further comprising a processing server that perform processing an event, wherein
    said distribution controller sets a processing rule that indicates processing based on attributes included in an event to said processing server, and generates said dispatch rule in which one or more conditions of attributes of an event processed according to said processing rule is set as said dispatch condition and an identifier of said processing server to which said processing rule is set as said destination.

3. The event processing system according to claim 1, wherein,
    when said dispatcher to which said dispatching target attribute matching any one of attributes included in said transmitting event has been assigned does not exist in said second dispatcher information, said device transmits a dispatcher information acquisition request including one of attributes included in said transmitting event to said distribution controller, and sets said identifier of said dispatcher included in a dispatcher information acquisition response received from said distribution controller to said second dispatcher information, and said distribution controller acquires said identifier of said dispatcher to which said dispatching target attribute matching an attribute included in said dispatcher information acquisition request received from said device has been assigned from said first dispatcher information, and transmits said dispatcher information acquisition response including said acquired identifier of said dispatcher to said device.

4. The event processing system according to claim 3, wherein said distribution controller further stores inter-dispatching target attributes relation information indicating the other dispatching target attribute related to said dispatching target attribute, and said distribution controller acquires said other dispatching target attribute related to said dispatching target attribute matching said attribute included in said dispatcher information acquisition request from said inter-dispatching target attributes relation information, acquires said identifier of said dispatcher to which said acquired other dispatching target attribute has been assigned from said first dispatcher information, and transmits said dispatcher information acquisition response which further includes said acquired other dispatching target attribute and said acquired identifier of said dispatcher to which said acquired other dispatching target attribute has been assigned to said device.

5. The event processing system according to claim 1, wherein said dispatching target attribute indicates a position.

6. The event processing system according to claim 4, wherein said dispatching target attribute indicates a position and said other dispatching target attribute related to said dispatching target attribute is a surrounding position on said position indicated by said dispatching target attribute.

7. An event processing system comprising a distribution controller and a plurality of dispatchers, wherein a dispatching target attribute, that is an attribute included in an event that is a dispatching target for each of said plurality of dispatchers, has been assigned to said each of said plurality of dispatchers, said distribution controller sets a dispatch rule including a dispatch condition indicating one or more conditions of attributes included in an event and a destination of an event that satisfies said dispatch condition to said dispatcher, to which said dispatching target attribute matching any one of said conditions of attributes included in said dispatch condition of said dispatch rule has been assigned, among said plurality of dispatchers, said each of said plurality of dispatchers, when receiving an event, transmits said received event to said destination corresponding to said dispatch condition when said received event satisfies said dispatch condition, with reference to said dispatch rule, and said distribution controller includes a dispatch rule generation device, and a plurality of dispatch rule setting devices which are arranged for respective groups each including one or more said dispatchers, said dispatch rule generation device generates and transmits said dispatch rule to said plurality of dispatch rule setting devices, and each of said plurality of dispatch rule setting devices sets said dispatch rule to said dispatcher, to which said dispatching target attribute matching any one of said conditions of attributes included in said dispatch condition of said dispatch rule has been assigned, among said dispatchers in said respective groups for which said each of said plurality of dispatch rule setting devices is arranged.

8. An event processing method comprising:

setting, from a distribution controller, a dispatch rule including a dispatch condition indicating one or more conditions of attributes included in an event and a destination of an event that satisfies said dispatch condition to a dispatcher, to which a dispatching target attribute matching any one of said conditions of attributes included in said dispatch condition of said dispatch rule has been assigned, among a plurality of said dispatchers;

transmitting, from said dispatcher that received the event, said received event to said destination corresponding to said dispatch condition when said received event satisfies said dispatch condition; and transmitting, from a device, an event to said dispatcher, to which said dispatching target attribute matching any one of attributes included in said transmitting event has been assigned, among said plurality of dispatchers, wherein said setting said dispatch rule from said distribution controller acquires an identifier of said dispatcher to which said dispatch rule to be set from first dispatcher information indicating said identifier of said dispatcher to which said dispatching target attribute has been assigned, and said transmitting said transmitting event from said device acquires said identifier of said dispatcher to which said transmitting event to be transmitted from second dispatcher information indicating said identifier of said dispatcher to which said dispatching target attribute has been assigned.

9. The event processing method according to claim 8, further comprising:

setting, from said distribution controller, a processing rule that indicates processing based on attributes included in an event to said processing server; and generating, in said distribution controller, said dispatch rule in which one or more conditions of attributes of an event processed according to said processing rule is set as said dispatch condition and an identifier of said processing server to which said processing rule is set as said destination.

10. The event processing method according to claim 8, wherein, said transmitting said transmitting event from said device includes:

when said dispatcher to which said dispatching target attribute matching any one of attributes included in said transmitting event has been assigned does not exist in said second dispatcher information, transmitting, from said device, a dispatcher information acquisition request including one of attributes included in said transmitting event to said distribution controller, acquiring, in said distribution controller, said identifier of said dispatcher to which said dispatching target attribute matching an attribute included in said dispatcher information acquisition request received from said device has been assigned from said first dispatcher information, transmitting, from said distribution controller, a dispatcher information acquisition response including said acquired identifier of said dispatcher to said device, and setting, in said device, said identifier of said dispatcher included in said dispatcher information acquisition response to said second dispatcher information.

11. The event processing method according to claim 10, wherein said transmitting said dispatcher information acquisition response from said distribution controller to said device includes:

acquiring, in said distribution controller, another dispatching target attribute related to said dispatching target attribute matching said attribute included in said dispatcher information acquisition request from an inter-dispatching target attributes relation information indicating the other dispatching target attribute related to said dispatching target attribute, acquiring, in said distribution controller, said identifier of said dispatcher to which said acquired other dispatching target attribute has been assigned from said first dispatcher information, and transmitting, from said distribution controller, said dispatcher information acquisition response which further includes said acquired other dispatching target attribute and said acquired identifier of said dispatcher to which said acquired other dispatching target attribute has been assigned to said device.

12. The event processing method according to claim 8, wherein said dispatching target attribute indicates a position.

13. The event processing method according to claim 11, wherein said dispatching target attribute indicates a position and said other dispatching target attribute related to said dispatching target attribute is a surrounding position on said position indicated by said dispatching target attribute.

14. An event processing method comprising:

setting, from a distribution controller, a dispatch rule including a dispatch condition indicating one or more conditions of attributes included in an event and a destination of an event that satisfies said dispatch condition to a dispatcher, to which a dispatching target attribute matching any one of said conditions of attributes included in said dispatch condition of said dispatch rule has been assigned, among a plurality of said dispatchers; and transmitting, in said dispatcher received an event, said received event to said destination corresponding to said dispatch condition when said received event satisfies said dispatch condition, wherein said setting said dispatch rule from said distribution controller includes:

generating, in a dispatch rule generation device in said distribution controller, said dispatch rule, transmitting, from said dispatch rule generation device in said distribution controller, to a plurality of dispatch rule setting devices which are arranged for respective groups each including one or more said dispatchers in said distribution controller, and setting, in each of said plurality of dispatch rule setting devices, said dispatch rule to said dispatcher, to which said dispatching target attribute matching any one of said conditions of attributes included in said dispatch condition of said dispatch rule has been assigned, among said dispatchers in said respective groups for which said each of said plurality of dispatch rule setting devices is arranged.

* * * * *

UNITED STATES PATENT AND TRADEMARK OFFICE
CERTIFICATE OF CORRECTION

PATENT NO. : 8,881,173 B2
APPLICATION NO. : 13/384742
DATED : November 4, 2014
INVENTOR(S) : Sawako Mikami It is certified that error appears in the above-identified patent and that said Letters Patent is hereby corrected as shown below:

In the Specification

Column 16, Line 17: Delete "41Q," and insert -- 410, --

Signed and Sealed this
Sixteenth Day of June, 2015

Michelle K. Lee
*Director of the United States Patent and Trademark Office*